US012684551B2

(12) United States Patent
Popp et al.

(10) Patent No.: US 12,684,551 B2
(45) Date of Patent: Jul. 14, 2026

(54) SYSTEMS AND METHODS FOR DE-CORRELATING CODED SIGNALS IN DUAL PORT TRANSMISSIONS

(71) Applicant: Apple Inc., Cupertino, CA (US)

(72) Inventors: Daniel Popp, Munich (DE); Lydi Smaini, San Jose, CA (US); Anatoliy S Ioffe, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 17/701,109

(22) Filed: Mar. 22, 2022

(65) Prior Publication Data

US 2023/0093484 A1 Mar. 23, 2023

Related U.S. Application Data

(60) Provisional application No. 63/247,710, filed on Sep. 23, 2021.

(51) Int. Cl.
*H04W 72/044* (2023.01)

(52) U.S. Cl.
CPC .............................. *H04W 72/0466* (2013.01)

(58) Field of Classification Search
CPC ............. H04W 72/0466; H04B 7/0626; H04B 7/0678; H04L 5/0021; H04L 27/2636;
(Continued)

(56) References Cited

U.S. PATENT DOCUMENTS 4,538,281 A * 8/1985 Rajan ....................... H04B 1/69
380/31
5,568,473 A * 10/1996 Hemmati ............. H04B 1/7107
375/148
(Continued)

FOREIGN PATENT DOCUMENTS

CN 1504018 A 6/2004
EP 881786 A2 * 12/1998 .......... H03M 7/4006
(Continued)

OTHER PUBLICATIONS

R1-090786, LG Electronics, "PUCCH TxD Schemes for LTE-A", 3GPP TSG RAN WG1 #56, Feb. 2009, Entire Document (Year : 2009).*
(Continued)

*Primary Examiner* — Ayaz R Sheikh
*Assistant Examiner* — Tarell A Hampton
(74) *Attorney, Agent, or Firm* — FLETCHER YODER PC

(57) ABSTRACT

User equipment (UE) applies a first code division multiplex access (CDMA) code to a baseband signal to generate a first signal, and a second CDMA code to the baseband signal to generate a second signal. The UE then transmits the first signal to a receiving device via a first antenna, and the second signal to the receiving device via a second antenna. The receiving device receives the first and second signals as a combined signal at an antenna, and extracts the first signal from the combined signal using the first CDMA code, and extracts the second signal from the combined signal using the second CDMA code. The CDMA codes may be real-valued or complex-valued. In some embodiments, the UE may separate the baseband signals into first and second portions, and transmit the first portion as part of the first signal and the second portion as part of the second signal.

20 Claims, 15 Drawing Sheets

(58) Field of Classification Search

CPC ....... H04J 2011/0006; H04J 2011/0009; H04J 11/00; H04J 13/0077; H04J 2211/006

See application file for complete search history.

(56) References Cited

U.S. PATENT DOCUMENTS

| | | | | |
|---|---|---|---|---|
| 5,579,304 A * | 11/1996 | Sugimoto | H04B 1/71072 | 375/267 |
| 5,586,113 A * | 12/1996 | Adachi | H04B 7/264 | 375/152 |
| 5,652,764 A | 7/1997 | Kanzaki et al. | | |
| 5,748,623 A * | 5/1998 | Sawahashi | H04J 13/00 | 370/342 |
| 5,859,875 A * | 1/1999 | Kato | H04B 7/0697 | 375/267 |
| 5,886,987 A * | 3/1999 | Yoshida | H04B 7/2628 | 370/335 |
| 6,049,535 A * | 4/2000 | Ozukturk | H04W 52/52 | 375/E1.006 |
| 6,115,406 A * | 9/2000 | Mesecher | H04B 7/0615 | 370/335 |
| 6,134,215 A * | 10/2000 | Agrawal | H04J 13/18 | 370/479 |
| 6,141,542 A * | 10/2000 | Kotzin | H04B 7/0684 | 455/562.1 |
| 6,173,007 B1 * | 1/2001 | Odenwalder | H04L 1/0059 | 375/377 |
| 6,252,864 B1 * | 6/2001 | Hayashi | H04B 7/0678 | 370/335 |
| 6,304,581 B1 * | 10/2001 | Chen | H04L 5/0044 | 370/320 |
| 6,393,047 B1 * | 5/2002 | Popovic' | H04B 1/707 | 370/441 |
| 6,421,327 B1 * | 7/2002 | Lundby | H04W 52/42 | 370/310 |
| 6,507,574 B1 * | 1/2003 | Kitade | H04W 52/42 | 370/335 |
| 6,519,238 B1 * | 2/2003 | Miya | H04B 1/70735 | 370/335 |
| 6,865,237 B1 * | 3/2005 | Boariu | H04B 7/0669 | 375/295 |
| 7,031,739 B1 * | 4/2006 | Imura | H04W 52/54 | 375/135 |
| 7,606,292 B1 * | 10/2009 | Harris | H04B 1/709 | 370/320 |
| 7,936,740 B2 * | 5/2011 | Fujii | H04L 1/0631 | 370/344 |
| 8,311,492 B2 * | 11/2012 | Kim | H04B 7/0697 | 455/101 |
| 10,637,705 B1 * | 4/2020 | Shattil | H04L 27/2614 | |
| 11,392,782 B2 * | 7/2022 | Kan | G06K 7/10019 | |
| 2002/0115473 A1 * | 8/2002 | Hwang | H04B 7/0632 | 455/562.1 |
| 2003/0012171 A1 * | 1/2003 | Schmidl | H04J 13/0048 | 455/42 |
| 2003/0031232 A1 | 2/2003 | Shi et al. | | |
| 2003/0043893 A1 * | 3/2003 | Jard | H04J 13/16 | 375/152 |
| 2003/0081563 A1 * | 5/2003 | Hottinen | H04L 1/0618 | 370/335 |
| 2003/0114193 A1 * | 6/2003 | Kavak | H04B 7/0617 | 455/562.1 |
| 2004/0001465 A1 * | 1/2004 | Timmerman | H04B 1/7105 | 370/335 |
| 2004/0022302 A1 * | 2/2004 | Olson | H04B 1/7103 | 375/148 |
| 2004/0047402 A1 * | 3/2004 | Hui | H04B 7/0669 | 375/E1.032 |
| 2004/0066761 A1 * | 4/2004 | Giannakis | H04B 7/0426 | 370/204 |
| 2004/0105489 A1 * | 6/2004 | Kim | H04B 7/0413 | 375/267 |
| 2004/0116146 A1 * | 6/2004 | Sadowsky | H04B 7/063 | 455/423 |
| 2004/0179588 A1 * | 9/2004 | Kuffner | G06K 7/10039 | 375/224 |
| 2005/0185734 A1 * | 8/2005 | Hottinen | H04B 7/0669 | 375/295 |
| 2005/0254476 A1 * | 11/2005 | Sudo | H04J 13/00 | 370/441 |
| 2005/0271121 A1 * | 12/2005 | Serratore | H04L 1/0618 | 375/148 |
| 2007/0041404 A1 * | 2/2007 | Palanki | H04W 72/20 | 370/479 |
| 2007/0140105 A1 * | 6/2007 | Coon | H04L 5/0016 | 370/208 |
| 2007/0165705 A1 * | 7/2007 | Coon | H04J 11/004 | 375/E1.02 |
| 2007/0253504 A1 * | 11/2007 | Hasegawa | H04L 5/0048 | 375/267 |
| 2008/0240269 A1 * | 10/2008 | Pajukoski | H04J 13/0044 | 375/260 |
| 2008/0242243 A1 * | 10/2008 | Kikuchi | H04B 7/0617 | 455/101 |
| 2008/0253469 A1 * | 10/2008 | Ma | H04L 27/2613 | 370/498 |
| 2009/0073025 A1 * | 3/2009 | Inoue | G01S 13/931 | 342/175 |
| 2009/0136034 A1 | 5/2009 | Gaal et al. | | |
| 2009/0176450 A1 * | 7/2009 | Chow | H01L 23/5227 | 455/41.1 |
| 2010/0039928 A1 * | 2/2010 | Noh | H04L 25/03929 | 370/210 |
| 2010/0202559 A1 | 8/2010 | Luo et al. | | |
| 2010/0214065 A1 * | 8/2010 | Maltseff | G06K 7/0008 | 235/492 |
| 2010/0260235 A1 * | 10/2010 | Yoshii | H04L 23/02 | 375/147 |
| 2011/0200018 A1 * | 8/2011 | Tazeh Mahalleh | H04L 5/0037 | 370/336 |
| 2011/0274193 A1 | 11/2011 | Yoon et al. | | |
| 2011/0286436 A1 * | 11/2011 | Suzuki | H04L 5/026 | 370/336 |
| 2012/0039270 A1 * | 2/2012 | Nguyen | H04L 27/2636 | 370/329 |
| 2012/0114016 A1 * | 5/2012 | Wehinger | H04B 7/0854 | 375/295 |
| 2012/0269138 A1 * | 10/2012 | Han | H04L 27/2697 | 370/329 |
| 2013/0034066 A1 * | 2/2013 | Kakishima | H04W 16/28 | 370/329 |
| 2013/0127660 A1 * | 5/2013 | Torimoto | G01S 19/11 | 342/357.29 |
| 2013/0295944 A1 * | 11/2013 | Saur | H04W 88/08 | 455/450 |
| 2014/0204800 A1 * | 7/2014 | Moulsley | H04L 5/003 | 370/254 |
| 2015/0063207 A1 * | 3/2015 | Nakamura | H04L 27/2647 | 370/328 |
| 2017/0201989 A1 * | 7/2017 | Fakoorian | H04L 5/0046 | |
| 2020/0162122 A1 | 5/2020 | Rieger et al. | | |
| 2022/0149670 A1 * | 5/2022 | Umeno | H04J 13/12 | |
| 2023/0247637 A1 * | 8/2023 | Lunttila | H04L 1/009 | 370/329 |

FOREIGN PATENT DOCUMENTS

| | | | |
|---|---|---|---|
| JP | 2007181199 A | 7/2007 | |
| JP | 2007243303 A | 9/2007 | |
| JP | 2012516073 A | 7/2012 | |
| KR | 10-20100060033 A | 6/2010 | |
| KR | 10-20210110575 A | 9/2021 | |
| WO | 2006102403 A2 | 9/2006 | |

(56)                    References Cited

FOREIGN PATENT DOCUMENTS

| | | | |
|---|---|---|---|
| WO | 2010031189 | A1 | 3/2010 |
| WO | 2011022684 | A2 | 2/2011 |

OTHER PUBLICATIONS

Velazquez-Gutierrez et al.; "Sequence Sets in Wireless Communication Systems: A Survey"; IEEE Communications Surveys & Tutorials, vol. 19, No. 2, pp. 1225-1248 (XP011651808).
Extended European Search Report for EP Application No. 22176442.6 dated Nov. 25, 2022; 10 pgs.
Office Action for Korean Patent Application No. 10-2022-0064481 dated Apr. 12, 2023; 5 pgs.
Office Action for Japanese Patent Application No. 2022-109960 dated Oct. 2, 2023; 8 pgs.

\* cited by examiner

BER:10$^{-2}$

BER:10$^{-3}$

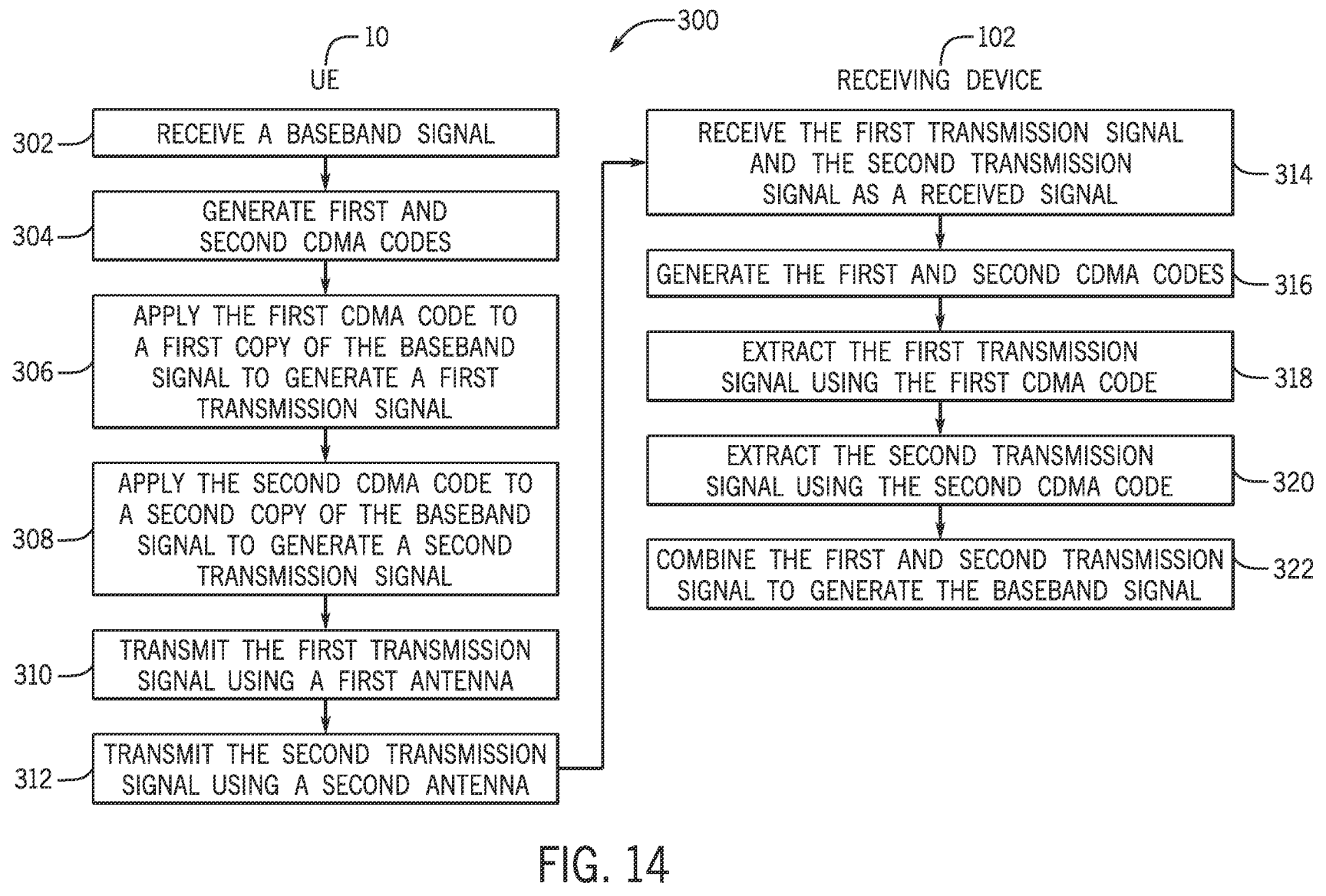

RECEIVING DEVICE 102

300

RECEIVE THE FIRST TRANSMISSION SIGNAL AND THE SECOND TRANSMISSION SIGNAL AS A RECEIVED SIGNAL — 314

GENERATE THE FIRST AND SECOND CDMA CODES — 316

EXTRACT THE FIRST TRANSMISSION SIGNAL USING THE FIRST CDMA CODE — 318

EXTRACT THE SECOND TRANSMISSION SIGNAL USING THE SECOND CDMA CODE — 320

COMBINE THE FIRST AND SECOND TRANSMISSION SIGNAL TO GENERATE THE BASEBAND SIGNAL — 322

UE 10

RECEIVE A BASEBAND SIGNAL — 302

GENERATE FIRST AND SECOND CDMA CODES — 304

APPLY THE FIRST CDMA CODE TO A FIRST COPY OF THE BASEBAND SIGNAL TO GENERATE A FIRST TRANSMISSION SIGNAL — 306

APPLY THE SECOND CDMA CODE TO A SECOND COPY OF THE BASEBAND SIGNAL TO GENERATE A SECOND TRANSMISSION SIGNAL — 308

TRANSMIT THE FIRST TRANSMISSION SIGNAL USING A FIRST ANTENNA — 310

TRANSMIT THE SECOND TRANSMISSION SIGNAL USING A SECOND ANTENNA — 312

FIG. 14

SYSTEMS AND METHODS FOR DE-CORRELATING CODED SIGNALS IN DUAL PORT TRANSMISSIONS

CROSS-REFERENCE TO RELATED APPLICATIONS

This application claims priority to U.S. Provisional Application No. 63/247,710, filed Sep. 23, 2021, entitled "SYSTEMS AND METHODS FOR DE-CORRELATING CODED SIGNALS IN DUAL PORT TRANSMISSIONS," the disclosure of which is incorporated by reference in its entirety for all purposes.

BACKGROUND

The present disclosure relates generally to wireless communication. In an electronic device, a transmitter may transmit a wireless signal to a receiver. In some cases, the transmitter may increase receive power of the wireless signal at the receiver by sending more than one instance (e.g., two instances) of the wireless signal (e.g., concurrently or simultaneously) to be received by the receiver, which may be referred to as dual transmission of the same waveform. However, at least a portion of the wireless signals may be canceled at the receiver due to a phase relationship between the wireless signals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a first set of antennas, and a second set of antennas. The user equipment also includes processing circuitry that applies a first code division multiplex access (CDMA) code to a baseband signal to generate a first signal, applies a second CDMA code to the baseband signal to generate a second signal, transmit the first signal via the first set of antennas, and transmits the second signal via the second set of antennas.

In another embodiment, an electronic device includes an antenna that receives a combined signal comprising a first signal encoded using a first CDMA code and a second signal encoded using a second CDMA code. The electronic device also includes processing circuitry that extracts the first signal from the combined signal using the first CDMA code, and extracts the second signal from the combined signal using the second CDMA code.

In yet another embodiment, a method includes receiving, by processing circuitry of user equipment, a baseband signal, and generating, by the processing circuitry, a first CDMA sequence and a second CDMA sequence. The method also includes applying, by the processing circuitry, the first CDMA sequence to the baseband signal to generate a first signal, and applying, by the processing circuitry, the second CDMA sequence to the baseband signal to generate a second signal. The method further includes transmitting, via a first set of antennas of the user equipment, the first signal, and transmitting, via a second set of antennas of the user equipment, the second signal.

Various refinements of the features noted above may exist in relation to various aspects of the present disclosure.

Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 14 is a flowchart of a method for dual transmission using different CDMA codes, according to embodiments of the present disclosure;

DETAILED DESCRIPTION OF SPECIFIC EMBODIMENTS

Figure 1:
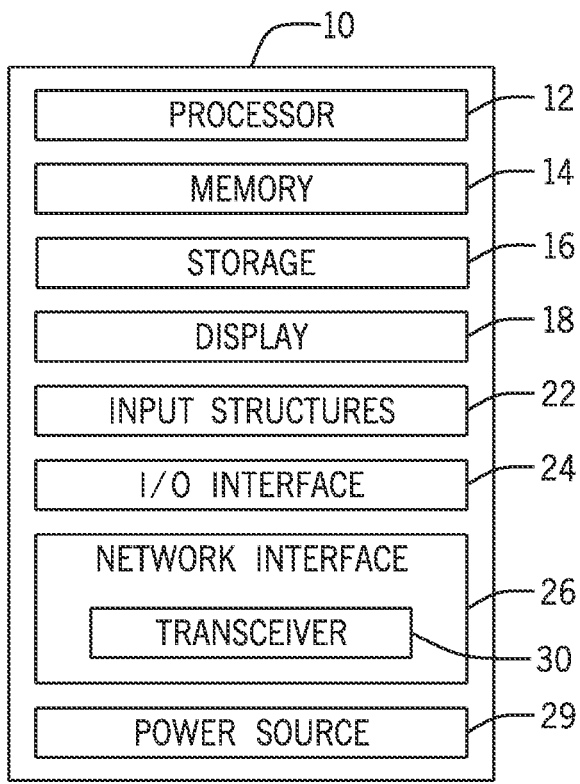
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to dual transmission of the same radio frequency signal or waveform in order to increase power of the signal when received at a target receiving device. However, dual transmission of the same signal may cause power fluctuations at a receiver of the receiving device. Indeed, at least a portion of the wireless signals may be canceled at an antenna of the receiving device due to a phase relationship between the wireless signals. In particular, a relative different in path attenuation combined with the phase relationship between the received signals may influence receiver signal strength (e.g., power of the received signals). In fact, with highly correlated channels (e.g., where a phase difference between the signals approaches 180°), dual transmission of the same signal may even perform worse than single transmission of the signal in terms of receiver signal strength.

In some cases, a closed feedback loop may be used to shift at least one of the wireless signals to realize an advantageous phase relationship between the two wireless signals (e.g., a near 0° phase difference). That is, the closed feedback loop may receive the two wireless signals as inputs, determine a phase difference between the two signals, and may shift one or both of the signals such that the phase difference between the two signals is 0°. However, for certain situations, utilizing a closed feedback loop may be undesirable. For example, in cases where the distance between the receiving device (e.g., a terrestrial base station, non-terrestrial base station, high altitude platform station (HAPS), satellite, and the like) and user equipment (e.g., a mobile wireless communication device) is greater than a threshold distance, sending corrections or a codebook (e.g., to achieve an advantageous phase difference between two wireless signals) may not be possible due to variations (e.g., fast channel variations that may affect timely receipt of the corrections or the codebook). Additionally, due to the possibility of at least partial signal cancellation, the receiving device and/or corresponding wireless communication network may need increased listening time until the receiving device may acknowledge the user equipment (e.g., by sending an acknowledgement or "ACK" signal to the user equipment). As such, open loop schemes, at least in these types of circumstances, may not suffer from such drawbacks and thus have superior performance than closed loop or feedback schemes.

In other cases, cyclic delay diversity schemes may improve dual transmission performance, gain at the antenna of the receiving device may be small for highly correlated channels (e.g., where a phase difference between dual transmitted signals approaches 180°). Additionally, time alignment error and cyclic delay diversity schemes may suffer from deep fading (e.g., strong destructive interference) due to allocations (e.g., data or symbols in the signals) being disposed at nulls or points of increased cancellation between the signals (e.g., which may be caused by combined delay), possibly resulting in loss of signal.

Embodiments herein provide various apparatuses and techniques to increase receive power at a receiving device by performing dual transmission of wireless signals and avoid cancelation between the wireless signals using an open loop or feedforward technique (e.g., without relying on a closed loop or feedback technique). To do so, the embodiments disclosed herein include user equipment applying a first code division multiplex access (CDMA) code to a baseband signal to generate a first signal, and a second CDMA code to the baseband signal to generate a second signal. The user equipment then transmits the first signal to the receiving device via a first antenna, and the second signal to the receiving device via a second antenna. The receiving device receives the first and second signals as a combined signal at an antenna, and extracts the first signal from the combined signal using the first CDMA code, and extracts the second signal from the combined signal using the second CDMA code. The CDMA codes may be real-valued or complex-valued. In some embodiments, the user equipment may separate the baseband signals into first and second portions, and transmit the first portion as part of the first signal and the second portion as part of the second signal.

With the foregoing in mind, FIG. 1 is a block diagram of user equipment 10 (e.g., an electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases)

that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
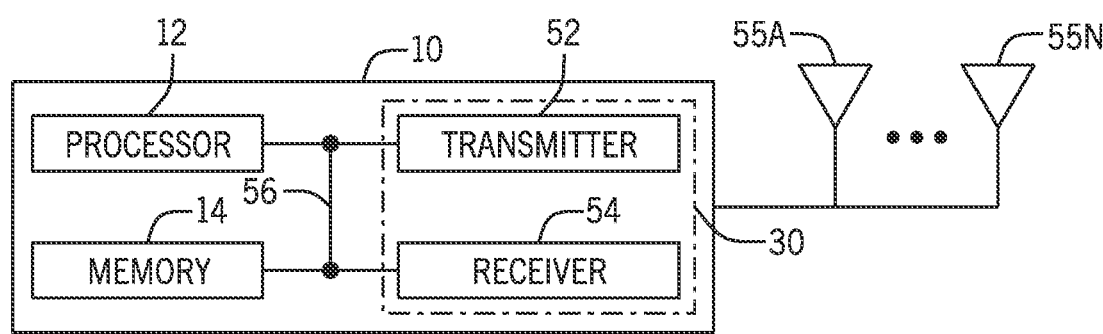
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figures 3, 4:
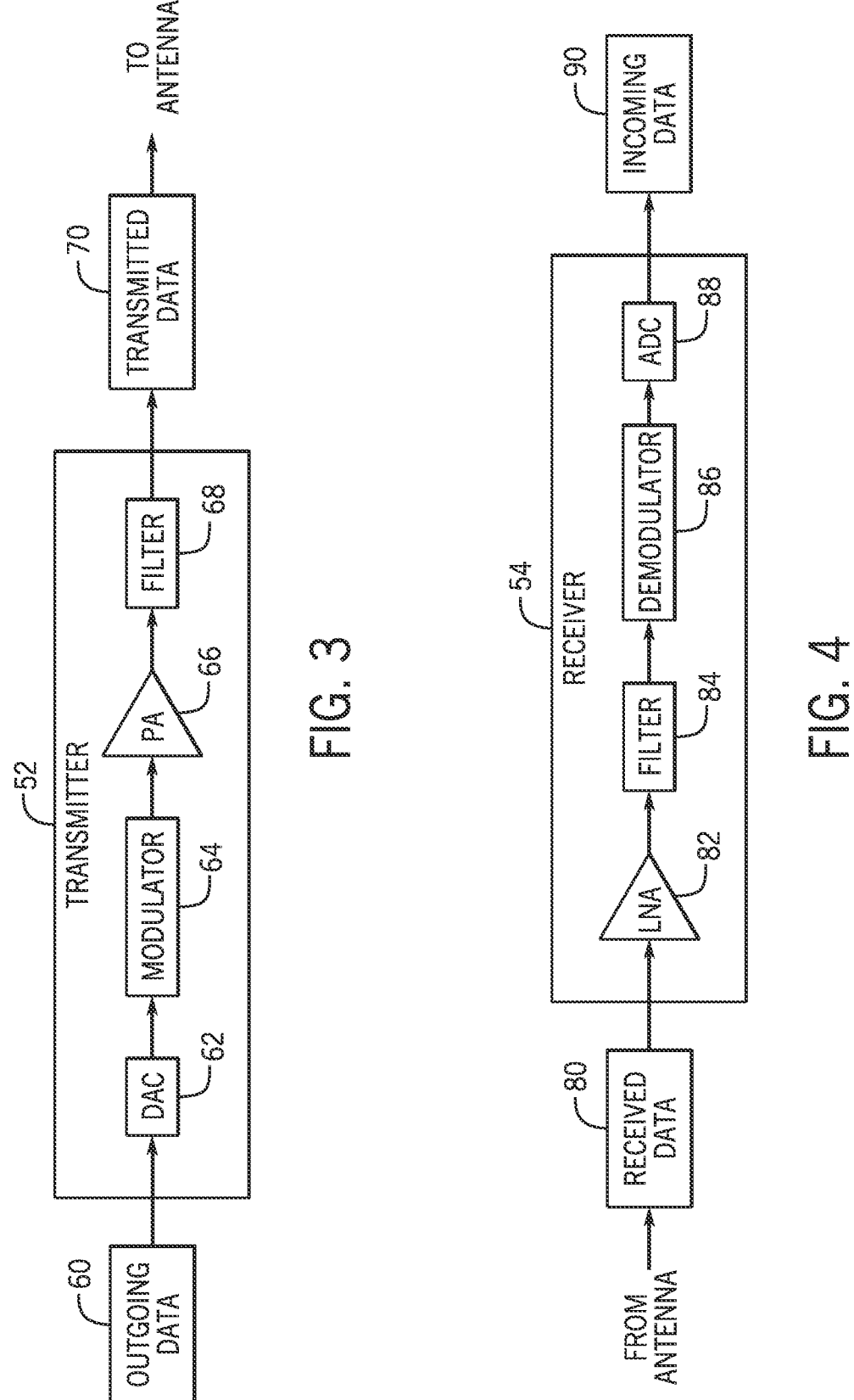
FIG. 3 is a schematic diagram of a transmitter of the user equipment of FIG. 1, according to embodiments of the present disclosure.
FIG. 4 is a schematic diagram of a receiver of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
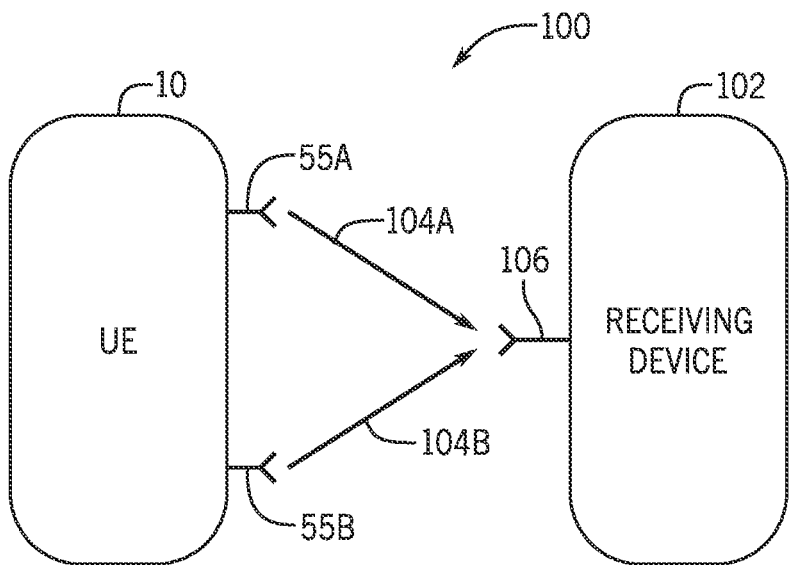
FIG. 5 is a schematic diagram of a wireless communication system including the user equipment of FIG. 1 and a receiving device, according to embodiments of the present disclosure.

FIG. 5 is a schematic diagram of a wireless communication system 100 including the user equipment 10 and a receiving device 102, according to embodiments of the present disclosure. The receiving device 102 may include any suitable electronic device (including in the form of or having similar components with the user equipment 10) that receives wireless signals from the user equipment 10. For example, the receiving device 102 may include or be part of a gateway or communication hub that is implemented as a terrestrial base station (e.g., a Node B, an Evolved Node B or eNodeB, a gNodeB, or the like), a non-terrestrial base station, a High Altitude Platform Station (HAPS), a satellite (e.g., a low Earth orbit (LEO) satellite, a medium Earth orbit (MEO) satellite, a geosynchronous Earth orbit (GEO) satellite), a ground station, and so on. To increase receive power of a wireless signal received by the receiving device 102, the user equipment 10 may send, via the transmitter 52, more than one wireless signal via more than one antenna to be received by the receiving device 102. For example, as illustrated, the user equipment 10 may send two signals 104A, 104B via two antennas 55A, 55B that are received at an antenna 106 of the receiving device 102. The two signals 104A, 104B may be identical, thus increasing the receive power at the receiving device 102 of the two signals 104A, 104B (e.g., by up to four times) of receiving a single such signal from the user equipment 10. That said, the two antennas 55A, 55B of the user equipment 10 and the antenna 106 of the receiving device 102 illustrated FIG. 5 are merely an example implementation, and the user equipment 10 may instead send any suitable number of signals (e.g., 3 or more signals, 4 or more signals, 6 or more signals, 8 or more signals, 12 or more signals, and so on) over any suitable number of antennas (e.g., 3 or more antennas, 4 or more antennas, 6 or more antennas, 8 or more antennas, 12 or more antennas, and so on) to be received by any suitable number of antennas (e.g., 3 or more antennas, 4 or more antennas, 6 or more antennas, 8 or more antennas, 12 or more antennas, and so on) of the receiving device 102.

However, the dual transmission by the two signals 104A, 104B may cause power fluctuations at the receiving device 102. Indeed, at least a portion of the signals 104A, 104B may be canceled at the antenna 106 of the receiving device 102 due to a phase relationship between the signals 104A, 104B. In particular, a relative different in path attenuation combined with the phase relationship between the signals 104A, 104B may influence receiver signal strength (e.g., power of the received signals). In fact, with highly correlated channels (e.g., where a phase difference between the signals 104A, 104B approaches 180°), dual transmission by the two signals 104A, 104B may even perform worse than single transmission of a signal (e.g., 104A or 104B) in terms of receiver signal strength.

Specifically, the closer the phase difference between the two signals 104A, 104B is to 0°, the higher receive power may be realized at the antenna 106 of the receiving device 102. On the other hand, the closer the phase difference between the two signals 104A, 104B is to 180°, the lower receive power may be realized at the antenna 106. Moreover, the closer the power values of the wireless signals 104A, 104B are together, the worse the effect of the lower receive power becomes when the phase difference between the two signals is closer to 180°. For example, if at or near a phase difference of 180°, the receive power may decrease at most 9 decibels (dB) if the two signals 104A, 104B differ in power level by 6 dB or more. However, if the two signals 104A, 104B differ in power level by 4 dB, the receive power may decrease approximately 13 dB. If the two signals 104A, 104B differ in power level by 2 dB, the receive power may decrease approximately 18 dB. If the two signals 104A, 104B are approximately the same in power level, the receive power may effectively decrease infinitely. As such, in some cases, highly correlated channels (e.g., where the phase difference between the signals 104A, 104B approaches 180°, such as at 170° or more, 160° or more, 150° or more, 135° or more, and so on) for dual transmission may exhibit worse performance than sending a single signal (e.g., 104A or 104B) via a single antenna (e.g., 55A or 55B).

In some cases, a closed feedback loop may be used to shift at least one of the wireless signals (e.g., 104A or 104B) to realize an advantageous phase relationship between the two wireless signals 104A, 104B (e.g., a near 0° phase difference, such as a 2° phase difference or less, a 5° phase difference or less, a 10° phase difference or less, a 15° phase difference or less, a 20° phase difference or less, and so on).

That is, the closed feedback loop may receive the two wireless signals 104A, 104B as inputs, determine a phase difference between the two signals 104A, 104B, and may shift one or both of the signals 104A, 104B such that the phase difference between the two signals is 0° or near 0°. However, for certain situations, utilizing a closed feedback loop may be undesirable. For example, in cases where the distance between the receiving device 102 and the user equipment 10 is greater than a threshold distance, sending corrections or a codebook (e.g., to achieve an advantageous phase difference between two wireless signals 104A, 104B) may not be possible due to variations (e.g., fast channel variations that may affect timely receipt of the corrections or the codebook). Additionally, due to the possibility of at least partial signal cancellation, the receiving device 102 and/or corresponding wireless communication network may need increased listening time until the receiving device 102 may acknowledge the user equipment 10 (e.g., by sending an acknowledgement or "ACK" signal to the user equipment). As such, open loop schemes, at least in these types of circumstances, may not suffer from such drawbacks and thus have superior performance than closed loop or feedback schemes.

In other cases, cyclic delay diversity schemes may improve dual transmission performance, gain at the antenna 106 of the receiving device 102 may be small for highly correlated channels (e.g., where a phase difference between dual transmitted signals approaches) 180°. Additionally, time alignment error and cyclic delay diversity schemes may suffer from deep fading (e.g., strong destructive interference) due to allocations (e.g., data or symbols in the signals 104A, 104B) being disposed at nulls or points of increased cancellation between the signals 104A, 104B (e.g., which may be caused by combined delay), possibly resulting in loss of signal.

Figure 6:
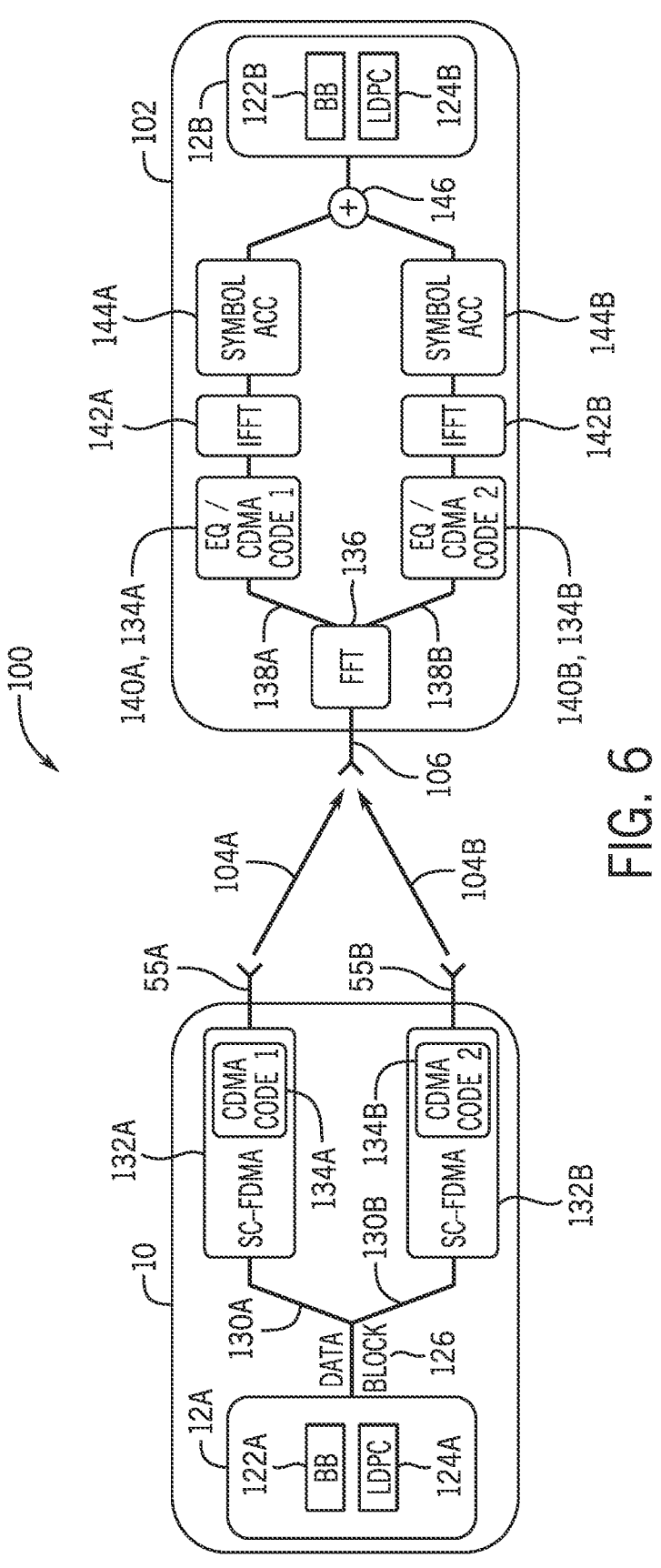
FIG. 6 is a block diagram showing components of the wireless communication system of FIG. 5, according to embodiments of the present disclosure.

FIG. 6 is a block diagram showing components of the wireless communication system 100 of FIG. 5, according to embodiments of the present disclosure. In particular, the receiving device 102 may include a terrestrial base station, non-terrestrial base station, high altitude platform station (HAPS), satellite, a gateway, an access point (e.g., a Wi-Fi access point), a router, and the like. The receiving device 102 may include a receiver, such as the receiver 54 of FIG. 4. As illustrated, the user equipment 10 may include a baseband (BB) processor 122A that generates or provides signals (e.g., carrying data) at a baseband frequency (e.g., lower than radio frequency, such as near zero frequency) to be sent to the receiving device 102. The user equipment 10 may also include low density parity check (LDPC) logic 124A that provides channel coding for the baseband signals. As illustrated, the baseband processor 122A and the LDPC logic 124A may be included in processing circuitry 12 of the user equipment 10.

The data in the signals may be apportioned into data blocks 126. A copy of the data is sent along two paths 130A, 130B—a first path 130A towards a first single carrier frequency division multiple access (SC-FDMA) logic 132A, which applies a first code division multiplex access (CDMA) code 134A (e.g., CDMA code 1) to a first copy of the data (e.g., generating a first encoded signal 104A), and a second path 130B towards a second SC-FDMA logic 132B, which applies a second, difference CDMA code 134B (e.g., CDMA code 2) to a second copy of the data (e.g., generating a second encoded signal 104B). The user equipment 10 then sends the first encoded signal 104A via a first antenna 55A and the second encoded signal 104B via a second antenna 55B to the receiving device 102 (e.g., concurrently or simultaneously). It should be understood that at least some of the components shown in the user equipment 10 may be implemented as part of the processing circuitry (e.g., the processor 12A) of the user equipment 10. Moreover, the first antenna 55A may include a first set of antennas (e.g., a first set of one antenna, a first set of multiple antennas that, for example, perform beamforming), and the second antenna 55B may include a second set of antennas (e.g., a second set of one antenna, a second set of multiple antennas that, for example, perform beamforming).

The receiving device 102 may receive the encoded signals 104A, 104B as a single received signal at a receive antenna 106 (though, in some cases, each signal or both signals may be received at multiple antennas). It should be understood that the receive antenna 106 may include a set of antennas (e.g., a set of one antenna, a set of multiple antennas that, for example, perform beamforming). A fast Fourier transform (FFT) logic 136 of the receiving device 102 may convert the received signal from a time domain to a frequency domain, and output the converted received signal along two paths 138A, 138B. A first copy of the converted received signal is sent to a first equalizer (EQ) 140A (e.g., a minimum mean square error (MMSE) equalizer) along a first path 138A, which equalizes a medium or channel of the received signal with respect to the first CDMA code 134A, thus de-correlating or extracting the first signal 104A from the received signal. In some embodiments, the first EQ 140A may be trained with the first CDMA code 134A and/or one or more pilot symbols (e.g., the first four pilot symbols) of the first signal 104A. A first inverse fast Fourier transform (IFFT) logic 142A may convert the first signal 104A from a frequency domain to a time domain, and then a symbol accumulator (ACC) 144A may determine symbols in the first signal 104A. A second copy of the converted received signal is sent to a second EQ 140B (e.g., an MMSE equalizer) along a second path 138B, which equalizes a medium or channel of the received signal with respect to the second CDMA code 134B, thus de-correlating or extracting the second signal 104B from the received signal. In some embodiments, the second EQ 140B may be trained with the second CDMA code 134B and/or one or more pilot symbols (e.g., the first four pilot symbols) of the second signal 104B. A second IFFT logic 142B may convert the second signal 104B from a frequency domain to a time domain, and then a second symbol ACC 144B may determine symbols in the second signal 104B. These are then combined or constructively added together at a combiner or adder 146, and sent to the baseband processor 122B and the LDPC logic 124B of the receiving device 102. As illustrated, the baseband processor 122B and the LDPC logic 124B may be included in processing circuitry 12B of the receiving device 102. In particular, the LDPC logic 124B may perform channel decoding of the baseband signal, and the baseband processor 122B may further generate, determine, process, use, and/or send the resulting signal (which may match or correlate to the original signal generated or provided by the baseband processor 122A of the user equipment 10) to other components of the receiving device 102. It should be understood that at least some of the components shown in the receiving device 102 may be implemented as the processing circuitry (e.g., the processor 12B) of the receiving device 102.

While a signal transmission of a single signal (e.g., via a single antenna) may use a default CDMA code with a certain number of orthogonal frequency-division multiplexing (OFDM) symbol repetitions, the dual transmission scheme illustrated in FIG. 6 may use different CDMA codes (e.g., 134A, 134B) for each transmission chain or path (e.g., 130A, 130B), combined with OFDM symbol repetitions. Then, as shown in FIG. 6, both transmission streams (e.g., sent as signals 104A, 104B) are de-correlated using the different CDMA codes (e.g., 134A, 134B) at the receiving device 102. In some embodiments, the CDMA codes (e.g., 134A, 134B) may be generated or optimized for signal de-correlation (after SC-FDMA operation) and low cross-correlation. Because the signals 104A, 104B are not the same signal, but instead de-correlated by encoding using different CDMA codes (e.g., 134A, 134B), the received signal strength at the antenna 106 may have reduced or even no signal degradation at the receiving device 102 as a disadvantageous phase difference between the de-correlated signals may not serve to cancel portions of the signals (104A, 104B) (e.g., as opposed to dual transmission of the same signal). Advantageously, the open loop scheme shown in FIG. 6 does not require a feedback channel, and the receiving device 102 may add streams associated with the same signal (but encoded with difference CDMA codes) in a constructive manner.

Figure 7:
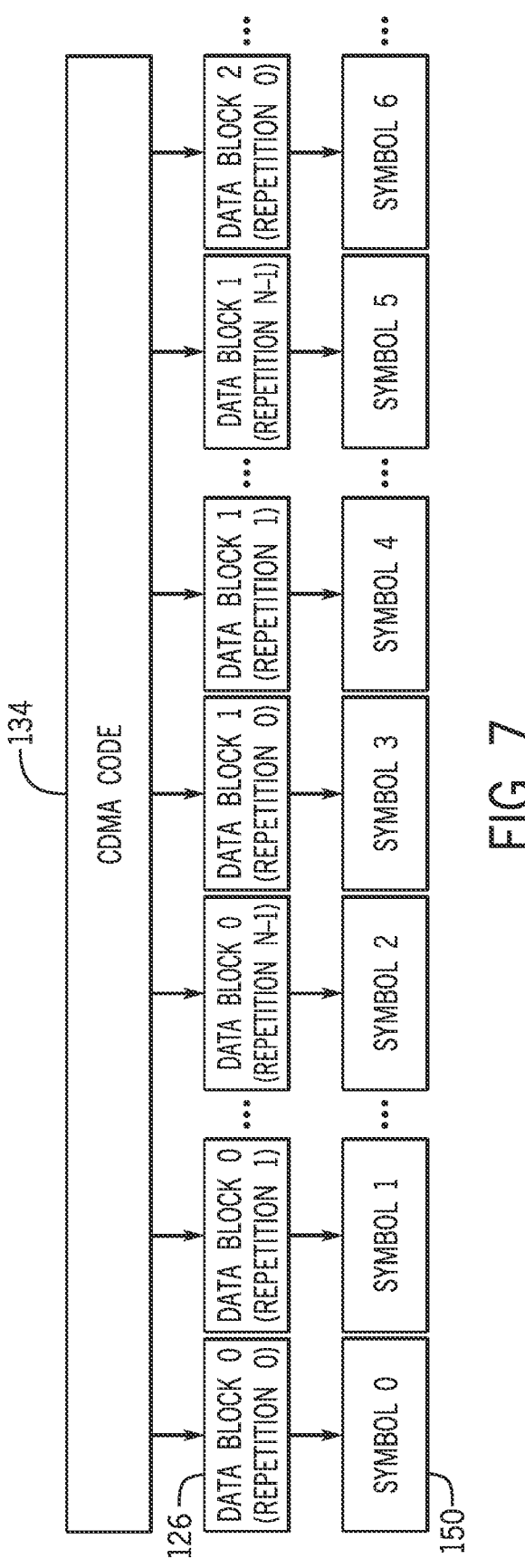
FIG. 7 is a block diagram of generating data blocks having orthogonal frequency-division multiplexing symbols using code division multiplex access (CDMA) codes, as may be performed by SC-FDMA logic of FIG. 6, according to embodiments of the present disclosure.

FIG. 7 is a block diagram of generating OFDM symbols 150 by applying a CDMA code (e.g., 134A or 134B, collectively 134) to data blocks 126, as may be performed by the SC-FDMA logic (e.g., 132A, 132B, collectively 132), according to embodiments of the present disclosure. In particular, each data block 126 may include bits, such as modulated bits, used to create an OFDM symbol 150. For example, each data block 126 may include a set of binary phase shift keying (BPSK) modulated bits. Each data block 126 (e.g., data block 0, data block 1, data block 2, and so on) may be repeatedly sent N times (e.g., repetition 0, repetition 1, . . . repetition N–1) before the next data block 126 is sent, which may include a new and/or different set of modulated bits. The data blocks 126 may be input to the SC-FDMA logic 132, as shown in FIG. 6, where at least a portion of the CDMA code 134 (as a CDMA sequence length may be much longer than that of a data block 126) is applied to the individual data blocks 126 in the frequency domain. In particular, a bit of the CDMA code 134 may be applied to (e.g., multiplied by) a bit of the data block 126. Due to different portions (e.g., bits) of the CDMA code 134 being applied to a data block 126, consecutive generated repetitions at the SC-FDMA logic 132 output of the data block 126 are different even as they contain the same data. Additionally, because the CDMA code 134A applied by the first SC-FDMA logic 132A disposed on the first path 130A is different than the CDMA code 134B applied by the second SC-FDMA logic 132B disposed on the second path 130B, the generated OFDM symbols 150 transmitted by each antenna 55A, 55B of the user equipment 10 are also different.

As discussed above, in the case where dual transmission is performed using two wireless signals having identical uplink data (which may be referred to as one-layer transmission), full signal cancelation at the receiver antenna 106 may occur with a 180° phase difference between two wireless signals. However, applying CDMA codes 134 to data (e.g., modulated bits), which may be referred to as two-layer transmission, may generate wireless signals 104A, 104B having different uplink data (e.g., different OFDM symbols 150). This may enable the wireless signals 104A, 104B to be received at the receiver antenna 106 with a reduced or no effect due to phase relation between the two signals 104A, 104B.

Figure 8:
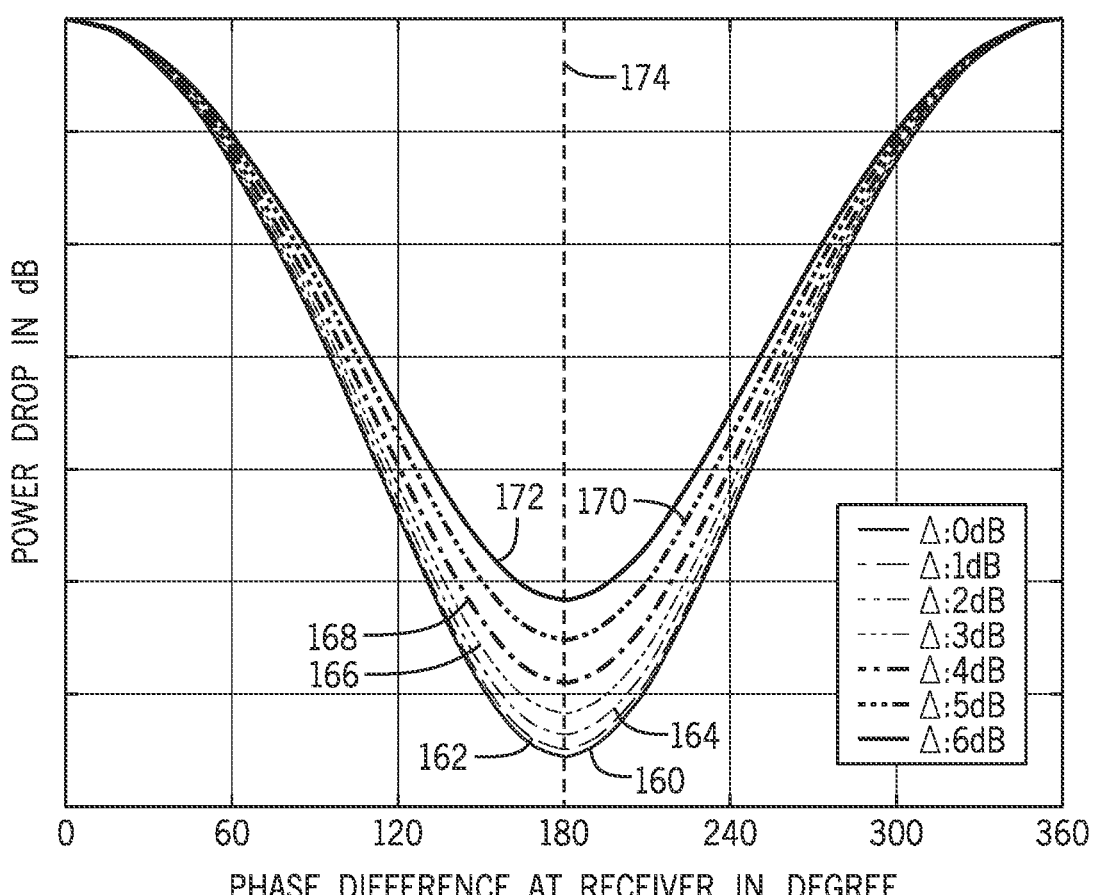
FIG. 8 is a plot of showing the effect of phase difference between two signals on power drop at an antenna of a receiving device, according to embodiments of the present disclosure.

FIG. 8 is a plot of showing the effects of phase and power difference between two signals (e.g., 104A, 104B) on power drop at the antenna 106 of the receiving device 102, according to embodiments of the present disclosure. The plot includes multiple curves 160, 162, 164, 166, 168, 170, 172 corresponding different power differences between the two signals (respectively, a 0 dB power difference, a 1 dB power difference, a 2 dB power difference, a 3 dB power difference, a 4 dB power difference, a 5 dB power difference, and a 6 dB power difference). The plot illustrates that, at or near a phase difference of 180° (as illustrated by dashed line 174) between the two signals, the receive power may decrease at most 2.6 dB if the two signals 104A, 104B differ in power level by 6 dB or more, as shown by curve 172. If the two signals 104A, 104B differ in power level by 4 dB, the receive power may decrease at least 2.9 dB, as shown by curve 168. If the two signals 104A, 104B differ in power level by 2 dB, the receive power may decrease approximately 3.1 dB, as shown by curve 164. If the two signals 104A, 104B are approximately the same in power level, the receive power may effectively decrease, for example, approximately 3.25 dB, as shown by curve 160. This indicates a significant reduction in power decrease compared to the one-layer transmission scheme where, as mentioned above, if at or near a phase difference of 180°, the receive power may decrease, for example, at most 9 dB if the two signals 104A, 104B differ in power level by 6 dB or more, the receive power may decrease approximately 13 dB if the two signals 104A, 104B differ in power level by 4 dB, the receive power may decrease, for example, approximately 18 dB if the two signals 104A, 104B differ in power level by 2 dB, and the receive power may effectively decrease infinitely if the two signals 104A, 104B are approximately the same in power level.

Figure 9:
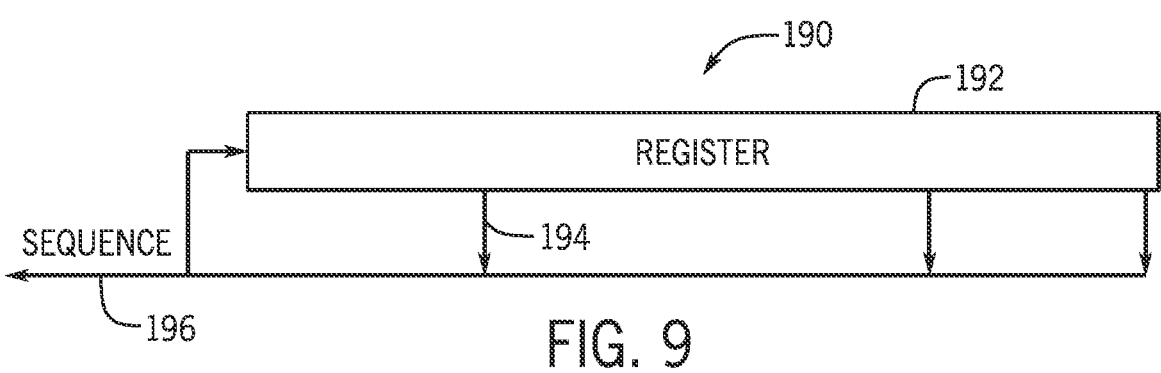
FIG. 9 is a block diagram of a sequence generator of the user equipment and/or receiving device of FIG. 6 that generates the CDMA codes, according to embodiments of the present disclosure.

The user equipment 10 and/or the receiving device 102 may each include a sequence generator 190 (e.g., in processing circuitry of the user equipment 10 and/or the receiving device 102, such as the processor 12) to generate the CDMA codes 134, as shown in FIG. 9, according to embodiments of the present disclosure. The sequence generator 190 may include a register 192 (e.g., a linear-feedback shift register (LFSR), such as a maximal LFSR) that generates register weights 194 or polynomials that specify a maximum length sequence (MLS) 196 of the CDMA codes 134. For example, the register weights 194 may include primitive polynomials of $x^M+1$, where $M=2^{20}-1=1048575$. Advantageously, symbolic calculators may not be able to factor $x^M+1$ due to the large M. The SC-FDMA logic 132A, 132B of the user equipment 10 and/or the equalizers 140A, 140B may then generate the CDMA codes 134 based on the sequences 196. This length enables more randomness in the CDMA codes 134 and less likelihood of patterns or repeating CDMA codes 134 occurring (e.g., to ensure that the two CDMA codes 134 applied to the two copies of data streams, such as on the two paths 130A, 130B of FIG. 6) between the generated OFDM symbols 150 in the two wireless signals 104A, 104B. As shown in FIG. 9, primitive polynomials 194 may be generated using up to three taps, though any suitable number of taps are contemplated (e.g., one or more, two or more, four or more, five or more, and so on). A tap refers to a bit position of a primitive polynomial 194 that is used to generate the next primitive polynomial 194. Using the three taps, at least 51 combinations are available to be used (excluding mirror sequences), such as $x^{20}+x^6+x^4+x+1$, $x^{20}+x^{16}+x^7+x^3+1$, and so on.

Figure 10:
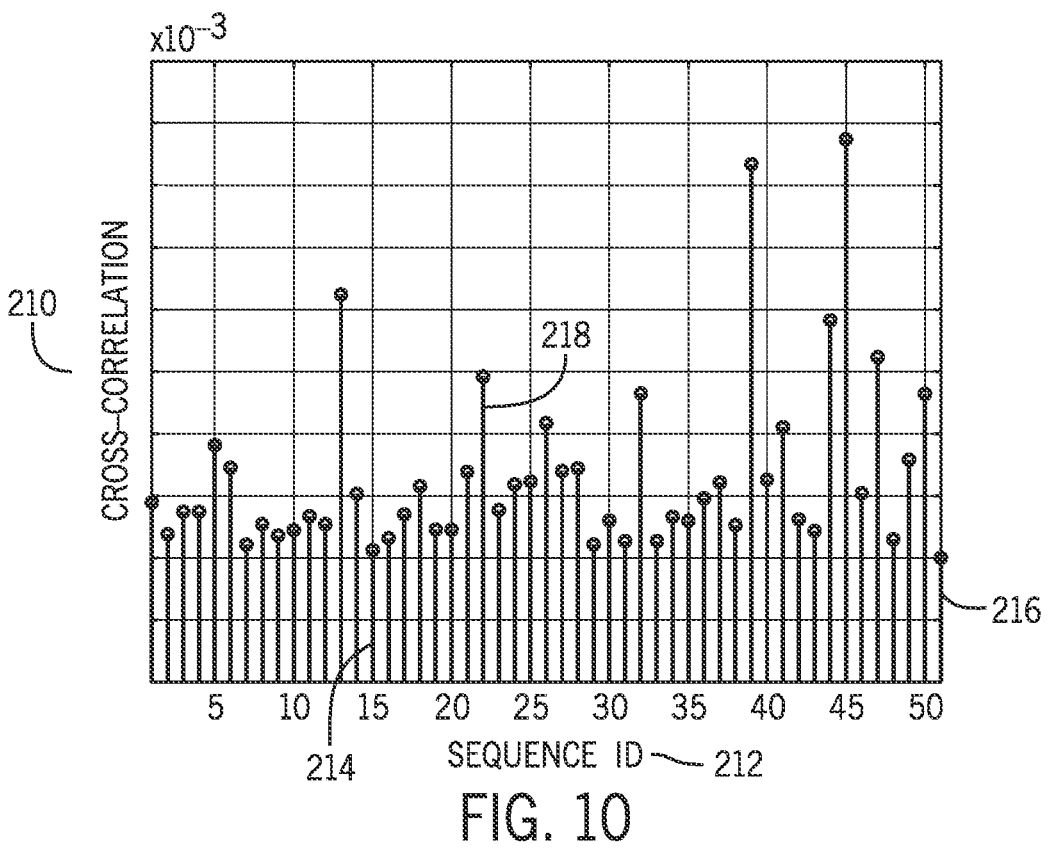
FIG. 10 is a distribution plot illustrating cross-correlation of sequences generated by the sequence generator of FIG. 9 with a default sequence, according to embodiments of the present disclosure.

For cross-correlation purposes, the sequences 196 may be compared to a default sequence (e.g., such as $x^{20}+x^{17}+1$). The sequences 196 may be used to generate a full uplink transmission (e.g., the wireless signals 104A, 104B). Cross-correlation (e.g., similarity to the default sequence) may then be determined, and power drop with respect to phase difference may be considered. In particular, a higher degree of cross-correlation with the default sequence may indicate a lesser degree of randomness, while a lower degree of cross-correlation with the default sequence may indicate a higher degree of randomness. FIG. 10 is a distribution plot illustrating cross-correlation 210 of the sequences 196 generated by the sequence generator 190 with the default sequence, according to embodiments of the present disclosure. Each polynomial 194 is indexed by a sequence identifier (ID) 212. For example, ID 15 (e.g., 214) corresponds to $x^{20}+x^6+x^5+x^2+1$, ID 51 (e.g., 216) corresponds to $x^{20}+x^{12}+x^9+x^8+1$, and, as shown in the plot of FIG. 10, the two polynomials 214, 216 have the lowest cross-correlation 210 with the default sequence. ID 22 (e.g., 218) is a mirror to and/or represents the default sequence. Mirror polynomials produce the same sequence but may be shifted by a certain amount of samples. In general, the sequences 196 (as identified using IDs 212) show good cross-correlation properties with respect to SC-FDMA coding, and all may be in a usable range. That is, no sequence need be excluded due to bad performance. Applying these sequences 196 to generate OFDM symbols 150, the resulting wireless signals 104A, 104B received may cause a power drop at the antenna 106 of the receiving device 102, at or near a phase difference of 180°, of less than 0.04 dB, less than 0.03 dB, less than 0.02 dB, or less than 0.01 dB (e.g., depending on how low the cross-correlation 210 with the default sequence is).

Advantageously, using different (e.g., two different) CDMA codes 134 to ultimately generate the wireless signals 104A, 104B improves receiver performance (e.g., at the antenna 106 of the receiving device 102) when compared to using the same CDMA code 134 to generate the wireless signals 104A, 104B. In terms of channel attenuation, when the two signals 104A, 104B have a phase difference of 180°, and the same CDMA code 134 is used, the channel attenuation (e.g., of a channel used to send the two signals 104A, 104B to the receiving device 102) may approach infinity. However, for the same circumstance, but using two different CDMA codes (e.g., 134A, 134B), the channel attenuation may be similar as that of when the two signals 104A, 104B have a phase difference of 0°. That is, the channel may have little to no impact due to phrase relation of the two signals 104A, 104B (e.g., two uplink streams) at the receiver antenna 106 if different CDMA codes 134 are used.

Moreover, bit error rate (BER) performance at the receiver antenna 106 of the receiving device 102 may also be improved. Generally, signal-to-noise ratio (SNR) may vary inversely with BER. That is, the lower the BER, the better the SNR. If the same CDMA code 134 is used to generate the wireless signals 104A, 104B, when the phase difference between the wireless signals 104A, 104B approaches 180°, this relationship degrades. That is, BER may no longer vary with SNR (e.g., the BER may remain at a constant value as SNR varies). Moreover, good SNR (e.g., 15 dB or greater) may only be achieved while having a high BER (e.g., greater than $10^{-2}$), when the phase difference between the wireless signals 104A, 104B approaches 180°. As such, when the phase difference between the wireless signals 104A, 104B approaches 180° and using the same CDMA code 134 to generate the wireless signals 104A, 104B, it may not be possible to receive a good quality signal at the antenna 106 in terms of both high SNR (e.g., 15 dB or greater) and low BER (e.g., greater than $10^{-2}$).

Figure 11:
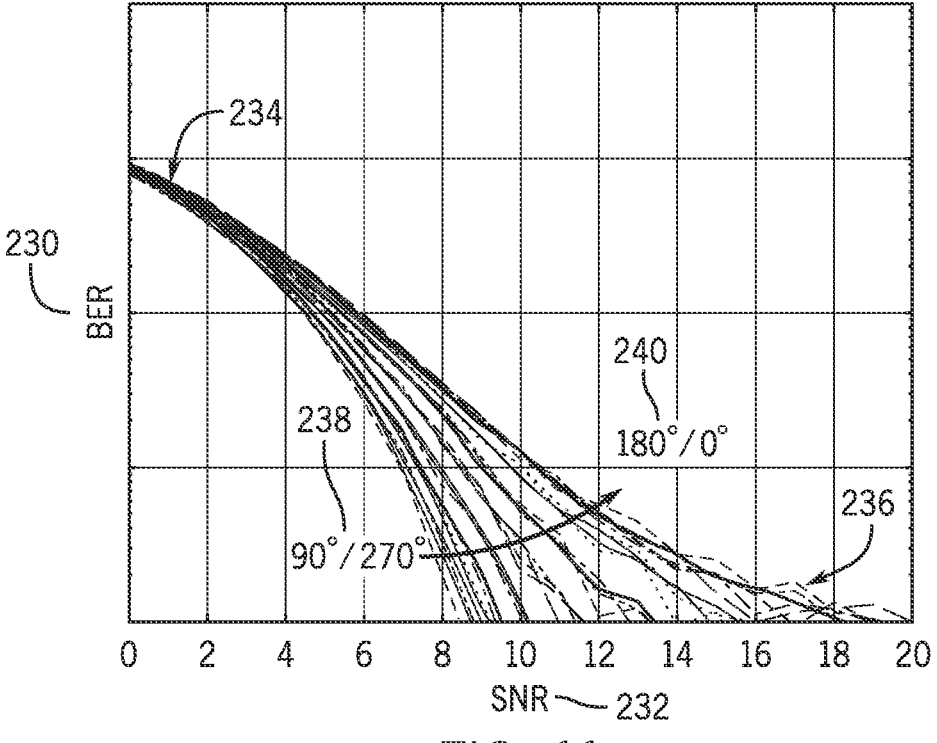
FIG. 11 is a plot illustrating bit error rate (BER) varying based on signal-to-noise ratio (SNR), according to embodiments of the present disclosure.
Figures 12, 13:
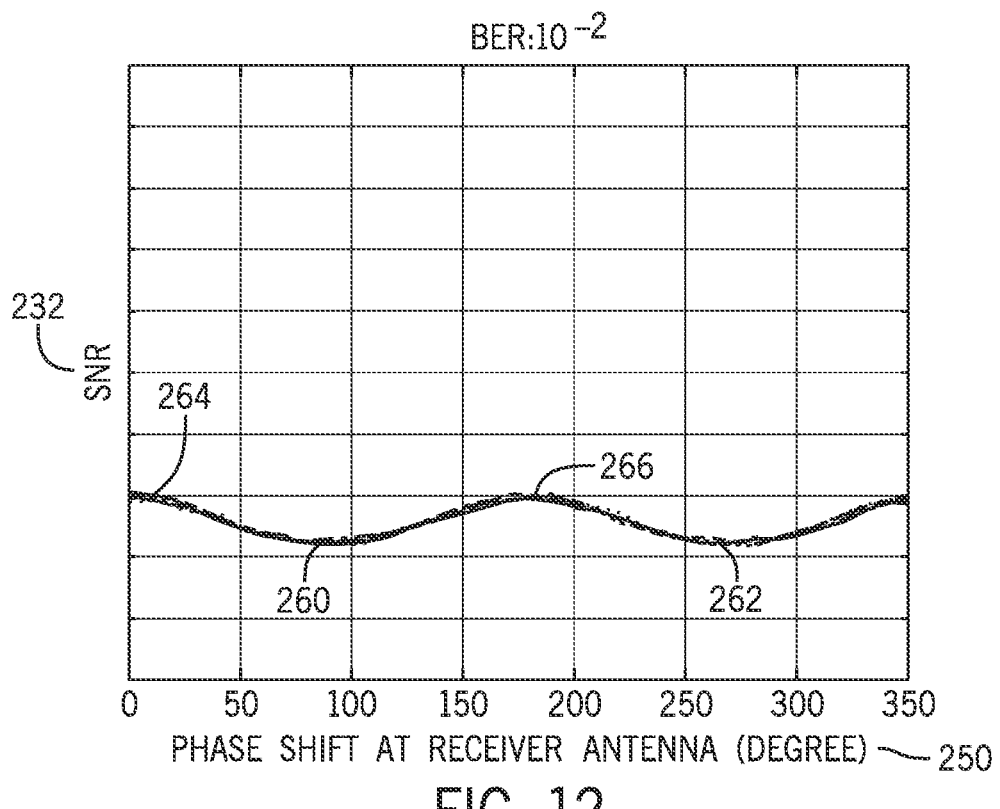
FIG. 12 is a plot illustrating SNR varying based on a phase difference between dual transmission wireless signals when the BER is $10^{-2}$, according to embodiments of the present disclosure.
FIG. 13 is a plot illustrating SNR varying based on a phase difference between dual transmission wireless signals when the BER is $10^{-3}$, according to embodiments of the present disclosure.

In contrast, FIGS. 11-13 are plots illustrating BER performance if different CDMA codes 134 are used on the uplink transmission signals 104A, 104B. In these plots, all 51 MLS's shown in FIG. 10 were used to generate the CDMA codes 134, and ultimately the signals 104A, 104B. In particular, FIG. 11 is a plot illustrating BER 230 (e.g., on a logarithmic scale) varying based on SNR 232, according to embodiments of the present disclosure. As shown, performance may be dependent on the phase shift at the receiver antenna 106. That is, higher BERs 234 (e.g., greater than $10^{-2}$) may be dominated by additive white Gaussian noise (AWGN). On the other hand, lower BERs 236 (e.g., less than $10^{-3}$) may be dominated by interference from other uplink transmissions. Moreover, at these lower BERs 236, the SNR 232 may be dependent on the phase difference between the wireless signals 104A, 104B. As indicated in the plot, if the phase difference between the wireless signals 104A, 104B approaches 90° or 270° (e.g., at 238), then the SNR 232 may be worse, whereas if the phase difference approaches 0° or 180° (e.g., at 240), then the SNR 232 may be better. In particular, there is approximately 12 dB of variation between the extreme phase difference values (e.g., 90° or 270° as shown at 238, compared to 0° or 180° as shown at 240).

FIG. 12 is a plot illustrating SNR 232 varying based on the phase difference or shift 250 between the wireless signals 104A, 104B when the BER is 10', and FIG. 13 is a plot illustrating SNR 232 varying based on the phase difference 250 between the wireless signals 104A, 104B when the BER is $10^{-3}$, according to embodiments of the present disclosure. As shown in FIG. 12, when the BER is $10^{-2}$, the SNR 232 is worse or lower (e.g., at a minimum) at 90° (e.g., at 260) and 270° (e.g., at 262), having a value of approximately 4 dB or lower. On the other hand, the SNR 232 is better or higher (e.g., at a maximum) at 0° (e.g., at 264) and 180° (e.g., at 266), having a value of approximately 6 dB or higher. In any case, no matter the phase difference 250 between the wireless signals 104A, 104B, the SNR 232 varies between approximately 4 dB and 6 dB. Compare that to using the same CDMA code 134 when the BER is $10^{-2}$, where the SNR 232 may approach infinity at 180°, but otherwise decrease exponentially to less than 2 dB when approaching 0° and 360°.

As shown in FIG. 13, when the BER is $10^{-3}$, the SNR 232 is worse or lower (e.g., at a minimum) at 90° (e.g., at 280) and 270° (e.g., at 282), having a value of approximately 7 dB or lower. On the other hand, the SNR 232 is better or higher (e.g., at a maximum) at 0° (e.g., at 284) and 180° (e.g., at 286), having a value of approximately 11 dB or higher. Compare that to using the same CDMA code 134 when the BER is $10^{-3}$, where the SNR 232 may approach infinity at 180°, but otherwise decrease exponentially to approximately 4 dB or less when approaching 0° and 360°. Accordingly, when compared to using the same CDMA code 134, using different CDMA codes 134 to generate the wireless signals 104A, 104B to perform dual transmission results in considerable performance gain.

FIG. 14 is a flowchart of a method 300 for dual transmission using different CDMA codes 134, according to embodiments of the present disclosure. Any suitable device (e.g., a controller) that may control components of the user equipment 10 and/or the receiving device 102, such as the processor 12 of each device, may perform the process blocks of method 300. In some embodiments, the method 300 may be implemented by executing instructions stored in a tangible, non-transitory, computer-readable medium, such as the memory 14 or storage 16 of the user equipment 10 and/or the receiving device 102, using the processor 12 of the user equipment 10 and/or the receiving device 102. For example, the method 300 may be performed at least in part by one or more software components, such as an operating system of the user equipment 10 and/or the receiving device 102, one or more software applications of the user equipment 10 and/or the receiving device 102, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the user equipment 10 receives a baseband signal. In particular, the processor 12A of the user equipment 10 may receive the baseband signal or an indication of the baseband signal from the baseband processor 122A and/or the LDPC logic 124A. The baseband signal may include data (e.g., control information, timing information, payload information, and so on) that is to be transmitted to the receiving device 102. In process block 304, the user equipment 10 generates first and second CDMA codes 134A, 134B. In particular, the processor 12A of the user equipment 10 may cause sequence generators 190 of the SC-FDMA logics 132A, 132B to generate MLSs 196, which the SC-FDMA logics 132A, 132B may then use to generate the CDMA codes 134. In some embodiments, the user equipment 10 may generate the first and second CDMA codes 134A, 134B in response to receiving an indication of the baseband signal.

In process block 306, the first SC-FDMA logic 132A applies the first CDMA code 134A to a first copy of the baseband signal to generate a first transmission signal 104A, and, in process block 308, the second SC-FDMA logic 132B applies the second CDMA code 134B to a second copy of the baseband signal to generate a second transmission signal 104B. In particular, the first SC-FDMA logic 132A may apply the first CDMA code 134A to the first copy of the baseband signal by multiplying the first CDMA code 134A and the first copy of the baseband signal to generate the first transmission signal 104A. Similarly, the second SC-FDMA logic 132B may apply the second CDMA code 134B to the second copy of the baseband signal by multiplying the second CDMA code 134B and the second copy of the baseband signal to generate the second transmission signal 104B. It should be understood that the processor 12A of the user equipment 10 may also apply any suitable modulation techniques to the copies of the baseband signal to convert them to the radio frequency transmission signals 104A, 104B. In process block 310, the transmitter 52 of the user equipment 10 transmits the first transmission signal 104A using the first antenna 55A, and, in process block 312, the transmitter 52 of the user equipment 10 transmits the second transmission signal 104B using the second antenna 55B.

In process block 314, a receiver of the receiving device 102 then receives the combined first and second transmission signals 104A, 104B as a received signal via the receive antenna 106. In process block 316, the receiving device 102 generates the first and second CDMA codes 134A, 134B (e.g., based on a seed and/or using a sequence generator 190 of the receiving device 102). In some embodiments, the receiving device 102 may generate the first and second CDMA codes 134A, 134B in response to receiving the combined first and second transmission signals 104A, 104B. In process block 318, the first equalizer 140A of the receiving device 102 de-correlates or extracts the first transmission signal 104A from the received signal using the first CDMA code 134A. In process block 320, the second equalizer 140B of the receiving device 102 de-correlates or extracts the second transmission signal 104B from the received signal using the second CDMA code 134B. The first IFFT logic 142A of the receiving device 102 may also convert the first signal 104A from a frequency domain to a time domain, and the first symbol ACC 144A of the receiving device 102 may determine symbols in the first signal 104A. Similarly, the second IFFT logic 142B of the receiving device 102 may also convert the second signal 104B from a frequency domain to a time domain, and the second symbol ACC 144B of the receiving device 102 may determine symbols in the second signal 104B.

In process block 322, the combiner or adder 146 of the receiving device 102 combines the symbols in the first and second signals 104A, 104B to generate the baseband signal originally sent by the user equipment 10. The LDPC logic 124B of the receiving device 102 may perform channel decoding of the baseband signal, and the baseband processor 122B of the receiving device 102 may further generate, determine, process, use, and/or send the baseband signal to other components of the receiving device 102. In this manner, the baseband signal may be received at the receiving device 102, with twice the receive power as a single signal sent from the user equipment 10 from a single antenna, without using a feedback or closed loop scheme. This may enable reception of signals with greater receive power over greater distances, such as in the case of terrestrial base stations, non-terrestrial base stations, HAPS, satellites, and the like, located greater than a threshold distance from the user equipment 10.

In some embodiments, the transmission signals 104A, 104B may be encoded using complex CDMA codes. In particular, for real-valued CDMA codes (e.g., those based on real numbers, which include decimals, fractions, negative integers, positive integers, and so on), the BER may be dependent upon the phase relation between the transmission signals 104A, 104B at the receiver antenna 106 in the case of BPSK modulation. In cases of the phase difference between the transmission signals 104A, 104B being approximately or approaching 90 degrees or 270 degrees, cross-noise may only be present on a quadrature component of the received (e.g., combined) signal. Advantageously, for BPSK modulation, the cross-noise power on the quadrature component does not contribute to BER. As such, while the BER is good or low (e.g., approaching negative infinity) for quadrature cross-noise (e.g., when the phase difference between the transmission signals 104A, 104B is approximately or approaching 90 degrees or 270 degrees), the BER is poor or high (e.g., approximately $10^{-3}$) for in-phase cross-noise (e.g., when the phase difference between the transmission signals 104A, 104B is approximately or approaching 0 degrees or 180 degrees).

However, with a complex CDMA code 134 (e.g., those which may be written as a sum or difference of a real number and an imaginary number), one portion of the cross-noise is found in the in-phase component of the received signal and another portion of the cross-noise is found in the quadrature component of the received signal. For example, a single LFSR 192 (e.g., of a sequence generator 190 of the user equipment 10 and/or the receiving device 102) may generate a complex exponential of a cumulative sum on the LFSR output, which the sequence generator 190 may use to generate the complex CDMA code 134. When compared to a real-valued CDMA code 134, use of the complex CDMA code 134 may smooth out BER performance (e.g., make the BER more consistent, average to approximately $10^{-4,4}$ or less over a range, such as the entire range, of phase differences between the transmission signals 104A, 104B) by equalizing the cross-noise that is present. Resulting power drop at the receiver antenna 106 may range from 0 to 0.05 dB, depending on the complex CDMA code 134 used. That is, using the complex CDMA code 134 generated using one LFSR 192 having the highest cross-correlation (e.g., worst case) to code or combine with the transmission signals 104A, 104B may result in approximately a 0.05 dB power drop at the receiver antenna 106, while using the complex CDMA code 134 generated using the one LFSR 192 having the lowest cross-correlation (e.g., best case) to code or combine with the transmission signals 104A, 104B may result in approximately a no power drop at the receiver antenna 106. Determining the degree of cross-correlation may be performed by comparing the complex CDMA code 134 to a default or control complex CDMA code 134, where a higher degree of cross-correlation with the default CDMA code 134 may indicate a lesser degree of randomness, while a lower degree of cross-correlation with the default CDMA code 134 may indicate a higher degree of randomness.

The present cross-noise may be additionally or alternatively equalized by using two LFSRs 192 with different primitive polynomials to generate a complex CDMA code 134 (e.g., one LFSR 192 for a real or in-phase component and one LFSR 192 for an imaginary or quadrature component). For example, in the case of using two LFSRs 192, the CDMA code 134 may include one of the following states: 1+i, 1−i, −1+i and −1−i. A first LFSR 192 may generate the real or in-phase component of the complex CDMA code 134, and a second LFSR 192 may generate the imaginary or quadrature component of the complex CDMA code 134. In such a case, each SC-FDMA logic 132A, 132B of the user equipment 10 and/or each equalizer 140A, 140B of the receiving device 102 may include two LFSRs 192. The complex CDMA code 134 generated by two LFSRs 192 may include more randomness than the complex CDMA code 134 generated by a single LFSR 192, which results in increased BER smoothness performance (e.g., make the BER more consistent, average to approximately $10^{-4,8}$ or less over a range, such as the entire range, of phase differences between the transmission signals 104A, 104B). Resulting power drop at the receiver antenna 106 may range from 0 to 0.03 dB, depending on the complex CDMA code 134 used. That is, using the complex CDMA code 134 generated using two LFSRs 192 having the highest cross-correlation (e.g., worst case) to code or combine with the transmission signals 104A, 104B may result in approximately a 0.03 dB power drop at the receiver antenna 106, while using the complex CDMA code 134 generated using the two LFSRs 192 having the lowest cross-correlation (e.g., best case) to code or combine with the transmission signals 104A, 104B may result in approximately a no power drop at the receiver antenna 106. As such, the dual LFSR 192 approach may generate more randomness and better performance than the single LFSR 192 approach.

Figure 15:
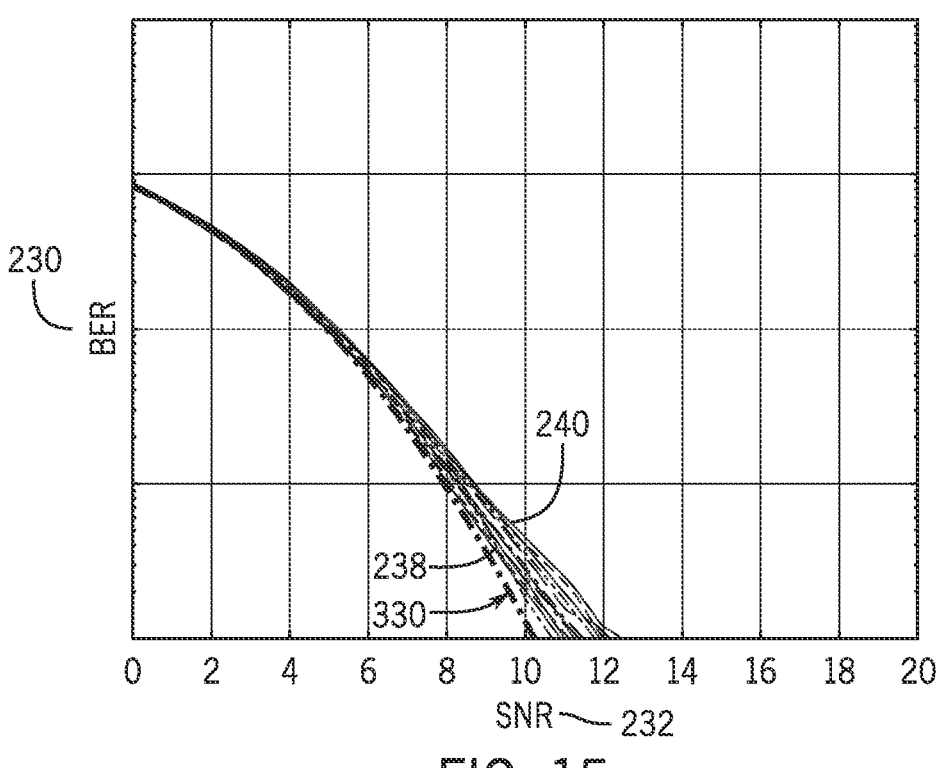
FIG. 15 is a plot illustrating BER varying based on SNR when using complex CDMA codes generated using one linear-feedback shift register (LFSR), according to embodiments of the present disclosure.

FIG. 15 is a plot illustrating BER 230 (e.g., on a logarithmic scale) varying based on SNR 232 when using complex CDMA codes 134 generated using one LFSR 192, according to embodiments of the present disclosure. In particular, the complex CDMA code 134 may be determined to have exhibited less (e.g., one of the lowest) cross-correlations (e.g., with a default complex CDMA code 134). As indicated in the plot, if the phase difference between the wireless signals 104A, 104B approaches 90° or 270° (e.g., at 238), then the SNR 232 may be worse, whereas if the phase difference approaches 0° or 180° (e.g., at 240), then the SNR 232 may be better. The plot also illustrates a 13 dB interference/noise floor 330. When compared to the plot of FIG. 11 that was generated when using real-valued CDMA codes 134, it may be observed that the complex CDMA codes 134 generated using one LFSR 192 perform better. In particular, there is less variation (e.g., approximately 2 dB) between the extreme phase difference values (e.g., 90° or 270° as shown at 238, compared to 0° or 180° as shown at 240) using the complex CDMA codes 134 generated using one LFSR 192 when compared to the real-valued CDMA codes 134 (e.g., approximately 12 dB), thus illustrating better BER performance.

Figure 16:
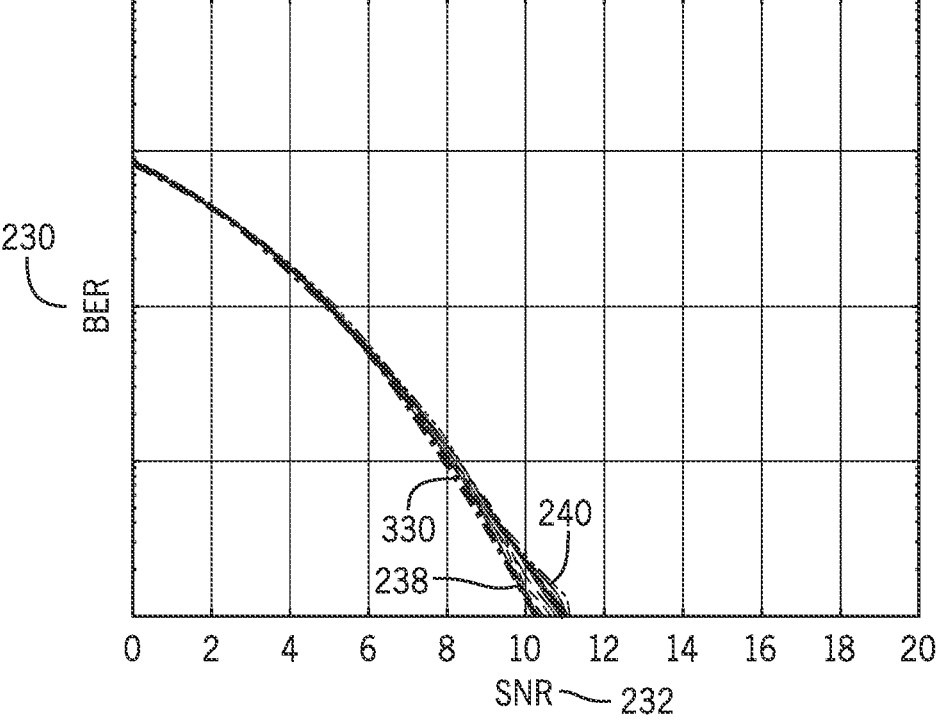
FIG. 16 is a plot illustrating BER varying based on SNR when using complex CDMA codes generated using dual LFSRs, according to embodiments of the present disclosure.

FIG. 16 is a plot illustrating BER 230 (e.g., on a logarithmic scale) varying based on SNR 232 when using complex CDMA codes 134 generated using dual LFSRs 192, according to embodiments of the present disclosure. In particular, the complex CDMA code 134 may be determined to have exhibited less (e.g., one of the lowest) cross-correlations (e.g., with a default complex CDMA code 134). As indicated in the plot, if the phase difference between the wireless signals 104A, 104B approaches 90° or 270° (e.g., at 238), then the SNR 232 may be worse, whereas if the phase difference approaches 0° or 180° (e.g., at 240), then the SNR 232 may be better. The plot also illustrates a 13 dB interference/noise floor 330. When compared to the plot of FIG. 11 that was generated when using real-valued CDMA codes 134 and the plot of FIG. 15 that was generated when using complex CDMA codes 134 generated using one LFSR 192, it may be observed that the complex CDMA codes 134 generated using dual LFSRs 192 perform better. In particular, there is less variation (e.g., approximately 1 dB) between the extreme phase difference values (e.g., 90° or 270° as shown at 238, compared to 0° or 180° as shown at 240) using the complex CDMA codes 134 generated using two LFSRs 192 when compared to the real-valued CDMA codes 134 (e.g., approximately 12 dB) and the using the complex CDMA codes 134 generated using one LFSR 192 (e.g., approximately 2 dB), thus illustrating better BER performance.

Figure 17:
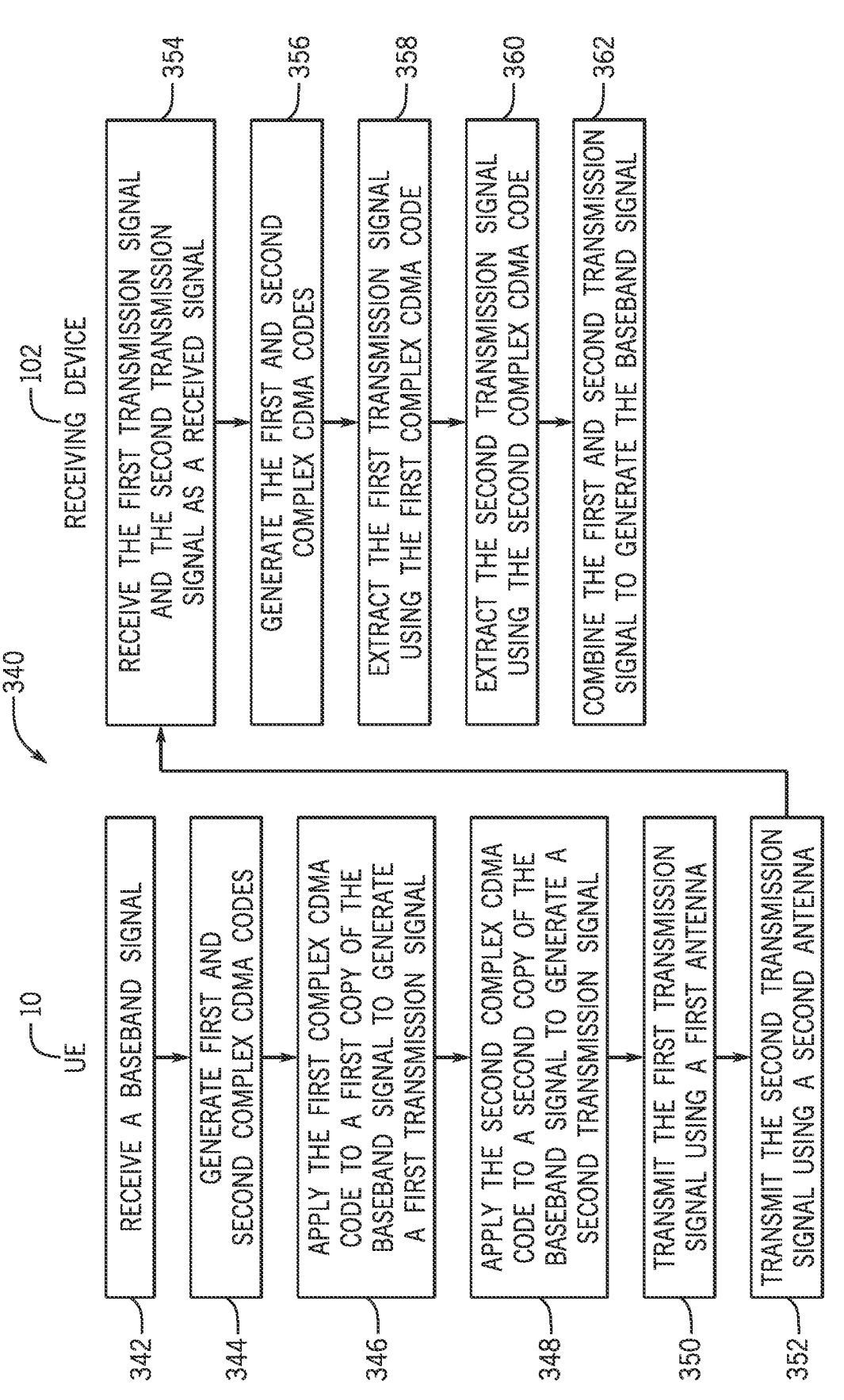
FIG. 17 is a flowchart of a method for dual transmission using complex CDMA codes, according to embodiments of the present disclosure.

FIG. 17 is a flowchart of a method 340 for dual transmission using complex CDMA codes, according to embodiments of the present disclosure. Any suitable device (e.g., a controller) that may control components of the user equipment 10 and/or the receiving device 102, such as the processor 12 of each device, may perform the process blocks of method 340. In some embodiments, the method 340 may be implemented by executing instructions stored in a tangible, non-transitory, computer-readable medium, such as the memory 14 or storage 16 of the user equipment 10 and/or the receiving device 102, using the processor 12 of the user equipment 10 and/or the receiving device 102. For example, the method 340 may be performed at least in part by one or more software components, such as an operating system of the user equipment 10 and/or the receiving device 102, one or more software applications of the user equipment 10 and/or the receiving device 102, and the like. While the method 340 is described using steps in a specific sequence, it should be understood that the present disclosure contemplates that the described steps may be performed in different sequences than the sequence illustrated, and certain described steps may be skipped or not performed altogether.

In process block 342, the user equipment 10 receives a baseband signal. In particular, the processor 12A of the user equipment 10 may receive the baseband signal or an indication of the baseband signal from the baseband processor 122A and/or the LDPC logic 124A. The baseband signal may include data (e.g., control information, timing information, payload information, and so on) that is to be transmitted to the receiving device 102. In process block 344, the user equipment 10 generates first and second complex CDMA codes 134A, 134B. In particular, a first sequence generator 190 of the user equipment 10 may be coupled to or include a first LFSR 192, and the processor 12A of the user equipment 10 may cause the first sequence generator 190 and the first LFSR 192 to generate a first sequence 196, and a first SC-FDMA logic 132A to generate a first complex CDMA code 134 based on the first sequence 196. Similarly, a second sequence generator 190 of the user equipment 10 may be coupled to or include a second LFSR 192, and the processor 12A of the user equipment 10 may cause the second sequence generator 190 and the second LFSR 192 to generate a second sequence 196, and a second SC-FDMA logic 1322 to generate a second complex CDMA code 134 based on the second sequence 196. The first and second LFSRs 192 may generate sequences 196 with complex exponentials of cumulative sums. In some embodiments, a dual LFSR 192 scheme may be used, such that each SC-FDMA logic 132A, 132B may include two LFSRs 192—one each for generating a real component of a complex CDMA code 134, and one each for generating an imaginary component the complex CDMA code 134. In some embodiments, the user equipment 10 may generate the first and second complex CDMA codes 134A, 134B in response to receiving an indication of the baseband signal.

In process block 346, the first SC-FDMA logic 132A applies the first complex CDMA code 134A to a first copy of the baseband signal to generate a first transmission signal 104A, and, in process block 348, the second SC-FDMA logic 132B the second complex CDMA code 134B to a second copy of the baseband signal to generate a second transmission signal 104B. In particular, the first SC-FDMA logic 132A may apply the first complex CDMA code 134A to the first copy of the baseband signal by performing complex multiplication between the two to generate the first transmission signal 104A. For example, the first SC-FDMA logic 132A may multiply a real or in-phase component of the first complex CDMA code 134A by the first copy of the baseband signal, multiply an imaginary or quadrature component of the first complex CDMA code 134A by a product of a unit imaginary number (e.g., j, which may be the square root of −1) and the first copy of the baseband signal, and sum the results together. Similarly, the second SC-FDMA logic 132B may apply the second complex CDMA code 134B to the second copy of the baseband signal by performing complex multiplication between the two to generate the second transmission signal 104B. For example, the second SC-FDMA logic 132B may multiply a real or in-phase component of the second complex CDMA code 134B by the second copy of the baseband signal, multiply an imaginary or quadrature component of the second complex CDMA code 134B by a product of the unit imaginary number and the second copy of the baseband signal, and sum the results together.

It should be understood that the processor 12A of the user equipment 10 may also apply any suitable modulation techniques to the copies of the baseband signal to convert them to the radio frequency transmission signals 104A, 104B. In process block 350, the transmitter 52 of the user equipment 10 transmits the first transmission signal 104A using the first antenna 55A, and, in process block 352, the transmitter 52 of the user equipment 10 transmits the second transmission signal 104B using the second antenna 55B.

In process block 354, a receiver of the receiving device 102 then receives the combined first and second transmission signals 104A, 104B as a received signal via the receive antenna 106. In process block 356, the receiving device 102 generates the first and second complex CDMA codes 134A, 134B. In particular, a first sequence generator 190 and an LFSR 192 of the receiving device 102 may generate the first complex CDMA code 134A if the first complex CDMA code 134A is generated using a single LFSR 192 scheme. If the first complex CDMA code 134A is generated using a dual LFSR 192 scheme, then the first sequence generator 190 and two LFSRs 192 of the receiving device 102 may generate the first complex CDMA code 134A. Similarly, a second sequence generator 190 and an LFSR 192 of the receiving device 102 may generate the second complex CDMA code 134B if the second complex CDMA code 134B is generated using a single LFSR 192 scheme. If the second complex CDMA code 134B is generated using a dual LFSR 192 scheme, then the second sequence generator 190 and two LFSRs 192 of the receiving device 102 may generate the second complex CDMA code 134B. In some embodiments, the sequence generators 190 and the LFSRs 192 may be part of or coupled to the equalizers 140A, 140B of the receiving device 102. In some embodiments, the receiving device 102 may generate the first and second CDMA complex codes 134A, 134B in response to receiving the combined first and second transmission signals 104A, 104B.

In process block 358, the first equalizer 140A of the receiving device 102 de-correlates or extracts the first transmission signal 104A from the received signal using the first complex CDMA code 134A. In process block 360, the second equalizer 140B of the receiving device 102 de-correlates or extracts the second transmission signal 104B from the received signal using the second CDMA code 134B. The first IFFT logic 142A of the receiving device 102 may also convert the first signal 104A from a frequency domain to a time domain, and the first symbol ACC 144A of the receiving device 102 may determine symbols in the first signal 104A. Similarly, the second IFFT logic 142B of the receiving device 102 may also convert the second signal 104B from a frequency domain to a time domain, and the second symbol ACC 144B of the receiving device 102 may determine symbols in the second signal 104B.

In process block 362, the combiner or adder 146 of the receiving device 102 combines the symbols in the first and second signals 104A, 104B to generate the baseband signal originally sent by the user equipment 10. The LDPC logic 124B of the receiving device 102 may perform channel decoding of the baseband signal, and the baseband processor 122B of the receiving device 102 may further generate, determine, process, use, and/or send the baseband signal to other components of the receiving device 102. In this manner, the baseband signal may be received at the receiving device 102, with twice the receive power as a single signal sent from the user equipment 10 from a single antenna, without using a feedback or closed loop scheme. This may enable reception of signals with greater receive power over greater distances, such as in the case of terrestrial base stations, non-terrestrial base stations, HAPS, satellites, and the like, located greater than a threshold distance from the user equipment 10. Moreover, using complex-valued rather than real-valued CDMA codes 134 may provide better performance (e.g., in terms of BER) by equalizing cross-noise that is present in the extracted transmission signals 104 and/or the combined baseband signal.

Part of combining first and second signals 104A, 104B includes the combiner or adder 146 of the receiving device 102 summing soft bits of the first and second signals 104A, 104B. Performance of summing the soft bits may be dependent on equalizer estimation error. In particular, the equalizers 140A, 140B of the receiving device 102, as shown in FIG. 6, have fixed noise floors due to interference from the dual uplink transmission streams (e.g., the first and second signals 104A, 104B), which may be independent of additive white Gaussian noise (AWGN) power (as opposed to the higher BERs 234 of FIG. 11, which may be dominated by additive white AWGN).

Ideal or perfect equalizer estimation (by the first and second equalizers 140A, 140B of the receiving device 102) when summing soft bits of the first and second signals 104A, 104B, which may result in a real component without an imaginary component, increases BER performance by approximately 3 dB. However, noise (e.g., AWGN and/or uplink interference) may cause errors in equalizer estimation, resulting in the summed soft bits having an imaginary component. Increasing spreading (e.g., repetitions of transmitting the transmission signals 104A, 104B) may decrease the noise in the received signal at the receiving device 102. For example, increasing spreading by a factor of two may decrease noise/interference by 3 dB. Moreover, it may be more robust and result in better performance to transmit two different data streams in the two transmission signals 104A, 104B while increasing spreading or CDMA-encoded transmission repetitions (e.g., by a factor of two). Doing so may achieve the same data rate with better performance for medium and/or high SNR.

Figures 18, 19:
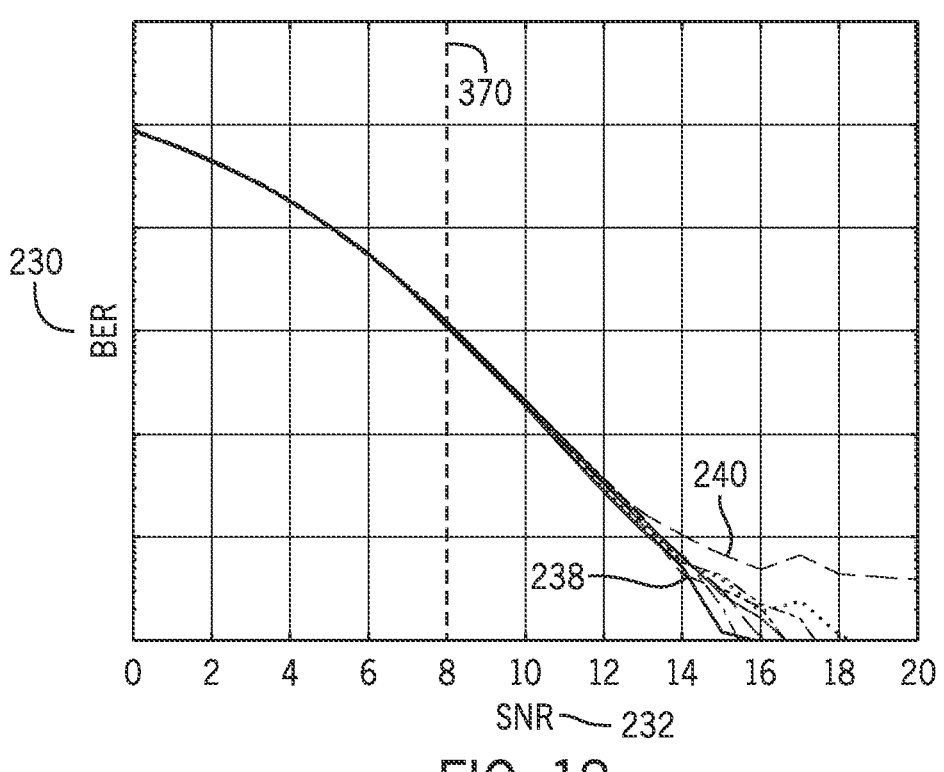
FIG. 18 is a plot illustrating BER varying based on SNR without increasing spreading by a factor of two and transmitting the same data in two transmission signals.
FIG. 19 is a plot illustrating BER varying based on SNR when increasing spreading by a factor of two and transmitting different data in the two transmission signals, according to embodiments of the present disclosure.

FIG. 18 is a plot illustrating BER 230 (e.g., on a logarithmic scale) varying based on SNR 232 without increasing spreading by a factor of two and transmitting the same data in two transmission signals 104A, 104B, while FIG. 19 is a plot illustrating BER 230 (e.g., on a logarithmic scale) varying based on SNR 232 when increasing spreading by a factor of two and transmitting different data in the two transmission signals 104A, 104B, according to embodiments of the present disclosure. As shown in FIG. 19, the BER performance is improved for all SNR when increasing spreading by a factor of two and transmitting different data in the two transmission signals 104A, 104B, and particularly for SNR greater than 8 dB (e.g., at 370). In particular, there is less variation (e.g., less than 1 dB) between the extreme phase difference values (e.g., 90° or 270° as shown at 238, compared to 0° or 180° as shown at 240) when increasing spreading by a factor of two and transmitting different data in the two transmission signals 104A, 104B, as shown in FIG. 19, when compared to not increasing spreading by a factor of two and transmitting the same data in two transmission signals 104A, 104B (e.g., at least 2 dB), as shown in FIG. 18, thus illustrating better BER performance.

Figure 20:
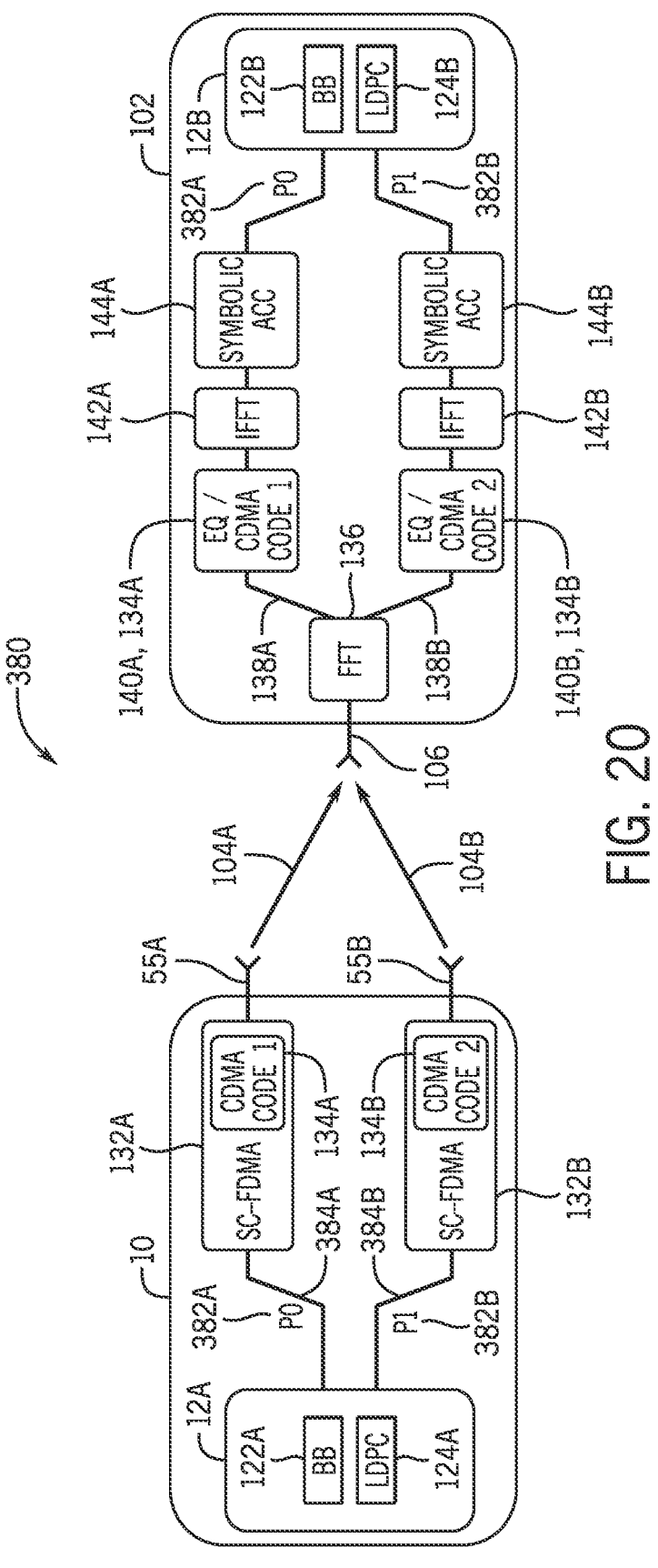
FIG. 20 is a block diagram of an alternative embodiment of the wireless communication system of FIG. 5 that transmits different data in the two transmission signals, according to embodiments of the present disclosure.

FIG. 20 is a block diagram of an alternative embodiment of the wireless communication system 380 of FIG. 5 that transmits different data in the two transmission signals 104A, 104B, according to embodiments of the present disclosure. The components of the wireless communication system 380 are similar or identical to those of the wireless communication system 100 of FIG. 6, however, rather than sending copies of a baseband signal to the first and second SC-FDMA logics 132A, 132B in the user equipment 10, baseband data is separated into a first part 382A (e.g., P0) and a second part 382B (e.g., P1). Data separation may be achieved, for example, by assigning data blocks with even numbers to a first part 382A (e.g., P0) and odd numbers to a second part 382B (e.g., P1), though any suitable data separation scheme is contemplated. As should be understood, the first part 382A of the baseband data may be a first half or portion of the baseband data that is different from the second part 382B of the baseband data, which may be a second half or portion of the baseband data. The first part 382A is sent on an upper path 384A to the first SC-FDMA logic 132A to be encoded using a first CDMA code 134A (e.g., CDMA code 1) and transmitted via a first antenna 55A in the form of a first radio frequency signal 104A, while the second part 382B is sent on a lower path 384B to the second SC-FDMA logic 132B to be encoded using CDMA code 134B (e.g., CDMA code 2) and transmitted via a second antenna 55B in the form of a second radio frequency signal 104B. In some embodiments, the baseband data may be separated into any suitable number of parts greater than 1 (e.g., two or more, three or more, four or more, ten or more, and so on), which may then be encoded using CDMA codes 134 and transmitted to the receiving device 102.

The receiving device 102 receives the radio frequency signals 104A, 104B as a received signal at its antenna 106, and reconstructs the original order of the data by inverting the data separation procedure. In particular, the receiving device 102 converts the received signal from a time domain to a frequency domain using the FFT logic 136. The receiving device 102 then sends a first copy of the received signal to an upper path 138A to a first equalizer 140A, which equalizes the medium or channel of the first copy of the received signal with respect to the first CDMA code 134A, thus de-correlating or extracting the first signal 104A from the received signal. A first IFFT logic 142A may convert the first signal 104A from a frequency domain to a time domain, and then a first symbol ACC 144A may determine symbols in the first signal 104A to output the first part 382A (e.g., P0) of the baseband data. Similarly, the receiving device 102 sends a second copy of the received signal to a lower path 138B to a second equalizer 140B, which equalizes the medium or channel of the second copy of the received signal with respect to the second CDMA code 134B, thus de-correlating or extracting the second signal 104B from the received signal. A second IFFT logic 142B may convert the second signal 104B from a frequency domain to a time domain, and then a second symbol ACC 144B may determine symbols in the second signal 104B to output the second part 382B (e.g., P1) of the baseband data.

Subsequently, in some embodiments, to achieve spreading (e.g., repetitions of transmitting the transmission signals 104A, 104B), the user equipment 10 and the receiving device 102 may repeat these steps (e.g., using different CDMA codes 134), such that the user equipment 10 again transmits the first and second parts 382A, 382B of the baseband data to the receiving device 102 in order to decrease the noise (e.g., by approximately 3 dB) in the received signal at the receiving device 102. In any case, the baseband processor 122B and/or the LDPC logic 124B of the receiving device 102 may then combine the first and second parts 382A, 382B to generate the baseband signal.

Figure 21:
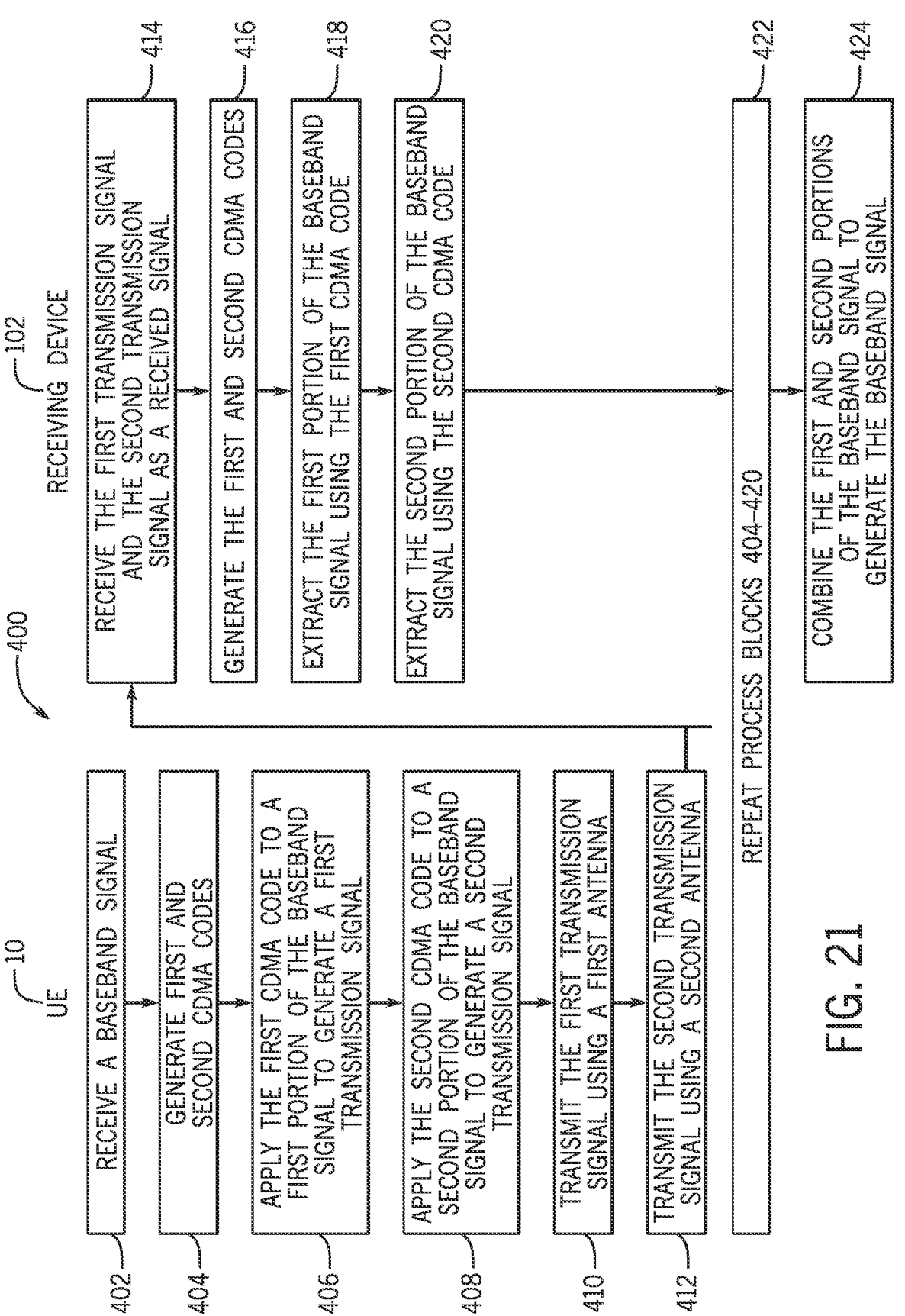
FIG. 21 is a flowchart of a method for dual transmission using different CDMA codes to transmit different data in each transmission signal, according to embodiments of the present disclosure.

FIG. 21 is a flowchart of a method 400 for dual transmission using different CDMA codes 134 to transmit different data in each transmission signal 104A, 104B, according to embodiments of the present disclosure. Any suitable device (e.g., a controller) that may control components of the user equipment 10 and/or the receiving device 102, such as the processor 12 of each device, may perform the process blocks of method 400. In some embodiments, the method 400 may be implemented by executing instructions stored in a tangible, non-transitory, computer-readable medium, such as the memory 14 or storage 16 of the user equipment 10 and/or the receiving device 102, using the processor 12 of the user equipment 10 and/or the receiving device 102. For example, the method 400 may be performed at least in part by one or more software components, such as an operating system of the user equipment 10 and/or the receiving device 102, one or more software applications of the user equipment 10 and/or the receiving device 102, and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the user equipment 10 receives a baseband signal. In particular, the processor 12A of the user equipment 10 may receive the baseband signal or an indication of the baseband signal from the baseband processor 122A and/or the LDPC logic 124A. The baseband signal may include data (e.g., control information, timing information, payload information, and so on) that is to be transmitted to the receiving device 102. In process block 404, the user equipment 10 generates first and second CDMA codes 134A, 134B. In particular, the processor 12A of the user equipment 10 may cause sequence generators 190 of the SC-FDMA logics 132A, 132B to generate MLSs 196, which the SC-FDMA logics 132A, 132B may then use to generate the CDMA codes 134. In some embodiments, the user equipment 10 may generate the first and second CDMA codes 134A, 134B in response to receiving an indication of the baseband signal.

In process block 406, the first SC-FDMA logic 132A applies the first CDMA code 134A to a first portion (e.g., 382A) of the baseband signal to generate a first transmission signal 104A, and, in process block 408, the second SC-FDMA logic 132B applies the second CDMA code 134B to a second portion (e.g., 382B) of the baseband signal to generate a second transmission signal 104B. In particular, the processor 12A of the user equipment 10 may separate the baseband signal by, for example, assigning data blocks with even numbers to the first portions 382A of the baseband signal and odd numbers to the second portions 382B of the baseband signal, though any suitable data separation scheme is contemplated. The first SC-FDMA logic 132A may apply the first CDMA code 134A to the first portion 382A of the baseband signal by multiplying the first CDMA code 134A and the first portion 382A to generate the first transmission signal 104A. Similarly, the second SC-FDMA logic 132B may apply the second CDMA code 134B to the second portion 382B of the baseband signal by multiplying the second CDMA code 134B and the second portion 382B to generate the second transmission signal 104B. It should be understood that the processor 12A of the user equipment 10 may also apply any suitable modulation techniques to the portions 382A, 382B of the baseband signal to convert them to the radio frequency transmission signals 104A, 104B. In process block 410, the transmitter 52 of the user equipment 10 transmits the first transmission signal 104A using the first antenna 55A, and, in process block 412, the transmitter 52 of the user equipment 10 transmits the second transmission signal 104B using the second antenna 55B.

In process block 414, a receiver of the receiving device 102 then receives the combined first and second transmission signals 104A, 104B as a received signal via the receive antenna 106. In process block 416, the receiving device 102 generates the first and second CDMA codes 134A, 134B (e.g., based on a seed and/or using a sequence generator 190 of the receiving device 102). In some embodiments, the receiving device 102 may generate the first and second CDMA codes 134A, 134B in response to receiving the combined first and second transmission signals 104A, 104B. In process block 418, the first equalizer 140A of the receiving device 102 de-correlates or extracts the first transmission signal 104A from the received signal using the first CDMA code 134A. In process block 420, the second equalizer 140B of the receiving device 102 de-correlates or extracts the second transmission signal 104B from the received signal using the second CDMA code 134B. The first IFFT logic 142A of the receiving device 102 may also convert the first signal 104A from a frequency domain to a time domain, and the first symbol ACC 144A of the receiving device 102 may determine symbols (e.g., the first portion 382A of the original baseband signal) in the first signal 104A. Similarly, the second IFFT logic 142B of the receiving device 102 may also convert the second signal 104B from a frequency domain to a time domain, and the second symbol ACC 144B of the receiving device 102 may determine symbols (e.g., the second portion 382B of the original baseband signal) in the second signal 104B.

In process block 422, the user equipment 10 and the receiving device 102 repeat process blocks 404-420. In particular, the user equipment 10 re-transmits the first and second portions 382A, 382B, as described in process blocks 410 and 412, to decrease the noise in the received signal at the receiving device 102. For better performance, the portions 382A, 382B may be encoded with different CDMA codes 134 than sent previously to increase diversity of signal, though, in alternative embodiments, the same CDMA codes 134 may be used, as described in process blocks 404-408. The receiving device 102 may receive the combined signal having the portions 382A, 382B, and may extract the portions, as described in process blocks 414-420. In particular, re-transmission of the first and second portions 382A, 382B may achieve spreading (e.g., repetitions of transmitting the transmission signals 104A, 104B), which may decrease the noise in the received signal by approximately 3 dB. The receiving device 102 may combine each copy of the first portion 382A by checking each copy of the first portion 382A against one another, and combine each copy of the second portion 382B by checking each copy of the second portion 382B against one another, to decrease errors that may have been caused due to transmission or reception.

In any case, in process block 424, the receiving device 102 combines the first and second portions 382A, 382B of the baseband signal sent in the first and second signals 104A, 104B to generate the baseband signal originally sent by the user equipment 10. The LDPC logic 124B of the receiving device 102 may perform channel decoding of the baseband signal, and the baseband processor 122B of the receiving device 102 may further generate, determine, process, use, and/or send the baseband signal to other components of the receiving device 102. In this manner, the baseband signal may be received at the receiving device 102, with twice the receive power as a single signal sent from the user equipment 10 from a single antenna, without using a feedback or closed loop scheme. This may enable reception of signals with greater receive power over greater distances, such as in the case of terrestrial base stations, non-terrestrial base stations, HAPS, satellites, and the like, located greater than a threshold distance from the user equipment 10. Moreover, better BER performance may be achieved when compared to sending the same data stream in the two transmitted signals.

In some embodiments, the user equipment 10 may transmit multiple instances of the wireless signals (e.g., including 104A, 104B) over a multi-path channel. For example, there may be ten or more paths in a channel, twenty or more paths in a channel, thirty or more paths in a channel, fifty or more paths in a channel, and so on. Flat fading in the multi-path channel, where each signal may experience an approximately same amount of attenuation, may be expressed as:

$$y = s0 + s1 \ \exp(j\varphi) \qquad \text{(Equation 1)}$$

where s0 is a first transmit signal (e.g., 104A) transmitted by a first antenna (e.g., 55A);

s1 is a second transmit signal (e.g., 104B) transmitted by a second antenna (e.g., 55B); and φ is a phase difference between the first and second transmit signals.

The multi-path may be expressed as $$y = s0 + s1 \ \exp(j\varphi_D) + A\delta(t - t_0)(s0 + s1 \ \exp(j\varphi_D))\exp(j\varphi_R) \quad \text{(Equation 2)}$$

where s0 is a first transmit signal (e.g., 104A) transmitted by a first antenna (e.g., 55A);

s1 is a second transmit signal (e.g., 104B) transmitted by a second antenna (e.g., 55B);

A is an attenuation of a multi-path component (e.g., A may be 10 dB attenuation);

t0 is a time difference between arrival of the first and second transmit signals (e.g., $t_0$ may be a time delay of 520 nanoseconds (ns));

$\varphi_D$ is a phase difference between the first and second transmit signals; and $\varphi_R$ is a phase shift of the multi-path component.

Figure 22:
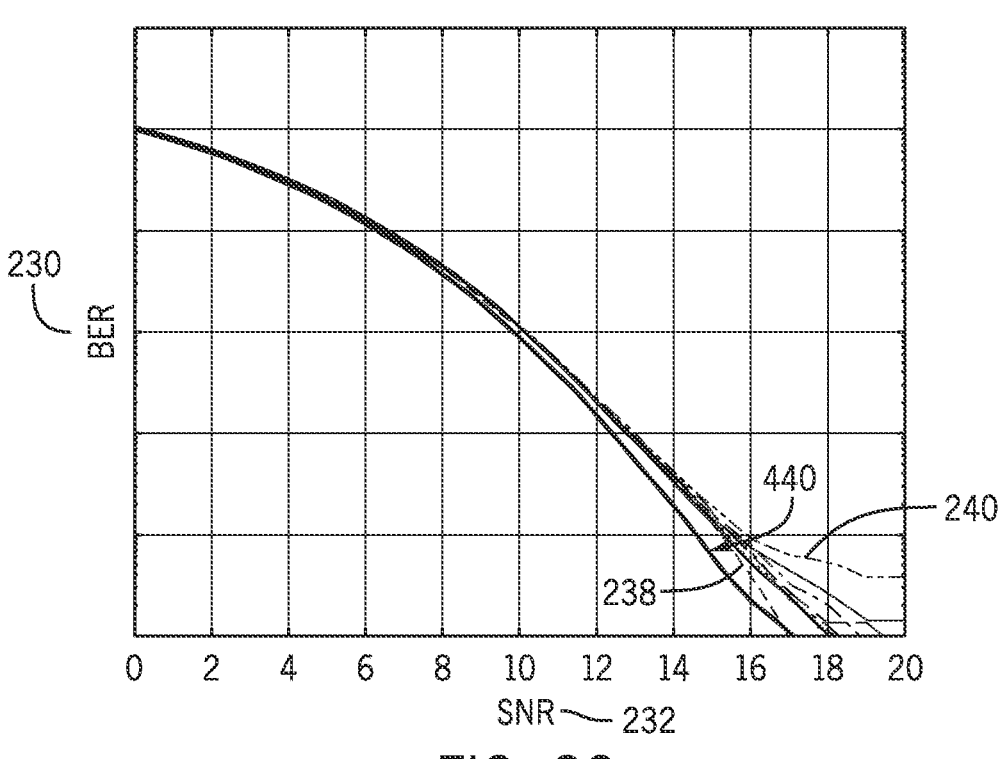
FIG. 22 is a plot illustrating BER varying based on SNR when spread or transmission signal repetition is increased (e.g., compared to that of FIG. 11) by an order of ten, where the transmission signals have the same data, according to embodiments of the present disclosure.

FIG. 22 is a plot illustrating BER 230 varying based on SNR 232 when spread or transmission signal repetition is increased (e.g., compared to that of FIG. 11) by an order of ten, where the transmission signals (e.g., including 104A, 104B) have the same data, according to embodiments of the present disclosure. As illustrated, a variation between the extreme phase difference values (e.g., 90° or 270° as shown at 238, compared to 0° or 180° as shown at 240) in SNR at least 2 dB when discounting a worst performing transmission signal 440.

Figure 23:
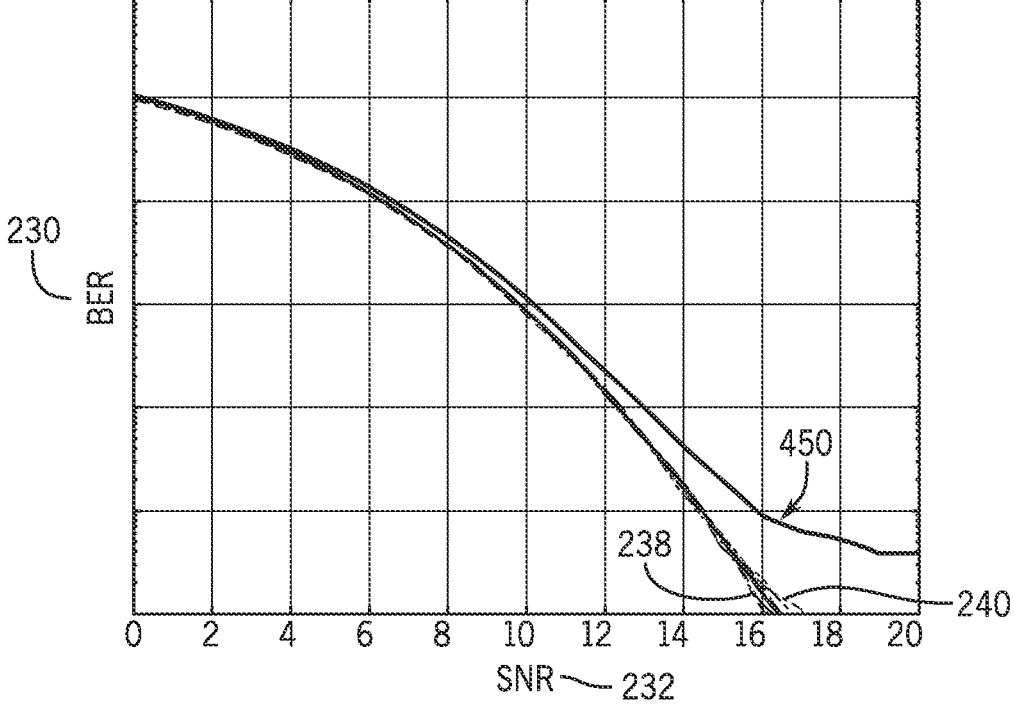
FIG. 23 is a plot illustrating BER varying based on SNR when spread or transmission signal repetition is increased (e.g., compared to that of FIG. 11) by an order of twenty, where the transmission signals have the different data, according to embodiments of the present disclosure.

FIG. 23 is a plot illustrating BER 230 varying based on SNR 232 when spread or transmission signal repetition is increased (e.g., compared to that of FIG. 11) by an order of twenty, where the transmission signals (e.g., including 104A, 104B) have the different data, according to embodiments of the present disclosure. As illustrated, a variation between the extreme phase difference values (e.g., 90° or 270° as shown at 238, compared to 0° or 180° as shown at 240) in SNR less than 1 dB when discounting a worst performing transmission signal 450. As such, there is less variation (e.g., less than 1 dB when discounting a worst performing transmission signal 450) between the extreme phase difference values (e.g., 90° or 270° as shown at 238, compared to 0° or 180° as shown at 240) when increasing spreading by a factor of twenty and transmitting different data in the transmission signals (e.g., including 104A, 104B), as shown in FIG. 23, when compared to increasing spreading by a factor of ten and transmitting the same data in the transmission signals (e.g., at least 2 dB when discounting a worst performing transmission signal 440), as shown in FIG. 22, thus illustrating better BER performance.

In another embodiment, successive interference cancelation techniques may be performed to reduce noise floor and allow better or near optimum performance. In yet another embodiment, CDMA code spread may be increased (e.g., by a factor of two) by using quadrature phase shift keying (QPSK) encoded data symbols and QPSK-like access code/pilot tones, which may increase robustness (e.g., in the case of short interference bursts) and enable using real-valued CDMA codes 134 (e.g., which would enable lower complexity). In another embodiment, multiple receiver antennas 106 and a maximum ratio combining (MRC) technique may be used to reduce interference noise floor based on the phase relation between the transmitted signals 104A, 104B. In another embodiment, backwards compatibility of dual transmission with single transmission may be implemented. That is, a different CDMA code 134 in the second transmission signal 104B may be applied to enable reception in the case where the receiving device 102 is not aware of second uplink transmission 104B.

Advantageously, the disclosed embodiments decrease or mitigate phase dependency (e.g., dependency on phase difference between the wireless signals 104A, 104B) at the receiving device 102, and uplink performance is improved compared to the case of a single transmitted signal. Moreover, no feedback channel is required for sending channel condition and/or a pre-coding matrix for correction/phase adjustment purposes. Moreover, the receiving device 102 may have control of constructively adding the data of both transmitted streams 104A, 104B together. This may be particularly beneficial in the case of rapidly changing channel conditions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
a first set of antennas;
a second set of antennas; and
processing circuitry configured to apply a first code division multiplex access (CDMA) code to a baseband signal via a first single carrier frequency division multiple access (SC-FDMA) logic to generate a first signal, apply a second CDMA code to the baseband signal via a second SC-FDMA logic to generate a second signal, transmit the first signal via the first set of antennas, and transmit the second signal via the second set of antennas, the first CDMA code and the second CDMA code each comprising a real-valued CDMA code or a complex-valued CDMA code.

2. The user equipment of claim 1, wherein the processing circuitry is configured to transmit the first signal via the first set of antennas concurrently with the second signal via the second set of antennas.

3. The user equipment of claim 1, wherein the first CDMA code is different from the second CDMA code.

4. The user equipment of claim 1, comprising a first linear-feedback shift register (LFSR) configured to generate a first primitive polynomial and a second LFSR configured to generate a second primitive polynomial, the processing circuitry configured to generate the first CDMA code based on the first primitive polynomial and generate the second CDMA code based on the second primitive polynomial.

5. The user equipment of claim 1, wherein a receiving device is configured to receive the first signal and the second signal as a received signal, the receiving device comprising additional processing circuitry configured to extract the first signal from the received signal using the first CDMA code, and extract the second signal from the received signal using the second CDMA code.

6. An electronic device, comprising:
an antenna configured to receive a combined signal comprising a first signal encoded using a first code division multiplex access (CDMA) code and a second signal encoded using a second CDMA code;
transform logic configured to convert the combined signal from a time domain to a frequency domain and output a first copy of the combined signal along a first path and a second copy of the combined signal along a second path;
a first equalizer configured to receive the first copy of the combined signal along the first path and equalize a first channel;
a second equalizer configured to receive the second copy of the combined signal along the second path and equalize a second channel;
processing circuitry configured to extract the first signal from the first copy of the combined signal by causing the first equalizer to equalize the first channel using the first CDMA code, and extract the second signal from the second copy of the combined signal by causing the second equalizer to equalize the second channel using the second CDMA code; and
an adder configured to combine a first set of symbols associated with the first signal and a second set of symbols associated with the second signal to generate a baseband signal.

7. The electronic device of claim 6, comprising a first linear feedback shift register (LFSR) configured to generate a first complex exponential of a first cumulative sum, the first CDMA code being based on the first complex exponential of the first cumulative sum, and a second LFSR configured to generate a second complex exponential of a second cumulative sum, the second CDMA code being based on the second complex exponential of the second cumulative sum.

8. The electronic device of claim 6, comprising a first linear feedback shift register (LFSR) configured to generate a first real component of the first CDMA code, a second LFSR configured to generate a first imaginary component of the first CDMA code, a third LFSR configured to generate a second real component of the second CDMA code, and a fourth LFSR configured to generate a second imaginary component of the second CDMA code.

9. The electronic device of claim 6, wherein the first signal and the second signal each comprises an instance of the baseband signal.

10. The electronic device of claim 6, wherein the first signal comprises a first portion of the baseband signal, and the second signal comprises a second portion of the baseband signal.

11. The electronic device of claim 6, wherein user equipment is configured to transmit the first signal and the second signal, the user equipment comprising additional processing circuitry configured to apply the first CDMA code to a first portion of the baseband signal to generate the first signal, apply the second CDMA code to a second portion of the baseband signal to generate the second signal, a first antenna configured to transmit the first signal, and a second antenna configured to transmit the second signal.

12. A method, comprising:

receiving, by processing circuitry of user equipment, a baseband signal;

generating, by the processing circuitry, a first code division multiplex access (CDMA) sequence and a second CDMA sequence, wherein the first CDMA sequence and the second CDMA sequence each comprise a real-valued CDMA sequence or a complex-valued CDMA sequence;

applying, by a first single carrier frequency division multiple access (SC-FDMA) logic, the first CDMA sequence to the baseband signal to generate a first signal;

applying, by a second SC-FDMA logic, the second CDMA sequence to the baseband signal to generate a second signal;

transmitting, via a first set of antennas of the user equipment, the first signal; and transmitting, via a second set of antennas of the user equipment, the second signal.

13. The method of claim 12, wherein the first CDMA sequence comprises a first in-phase component and a first quadrature component, and applying, by the first SC-FDMA logic, the first CDMA sequence to the baseband signal comprises performing complex multiplication using the first in-phase component and the first quadrature component on the baseband signal to generate the first signal.

14. The method of claim 13, wherein the second CDMA sequence comprises a second in-phase component and a second quadrature component, and applying, by the second SC-FDMA logic, the second CDMA sequence to the baseband signal comprises performing complex multiplication using the second in-phase component and the second quadrature component on the baseband signal to generate the second signal.

15. The method of claim 12, comprising:

generating, by the processing circuitry, a third CDMA sequence and a fourth CDMA sequence;

applying, by the first SC-FDMA logic, the third CDMA sequence to the baseband signal to generate a third signal;

applying, by the second SC-FDMA logic, the fourth CDMA sequence to the baseband signal to generate a fourth signal;

transmitting, via the first set of antennas of the user equipment, the third signal; and transmitting, via the second set of antennas of the user equipment, the fourth signal.

16. The method of claim 12, comprising, separating, by the processing circuitry, the baseband signal into a first portion and a second portion, wherein applying, by the first SC-FDMA logic, the first CDMA sequence to the baseband signal to generate the first signal comprises applying, by the first SC-FDMA logic, the first CDMA sequence to the first portion, and applying, by the second SC-FDMA logic, the second CDMA sequence to the baseband signal to generate the second signal comprises applying, by the second SC-FDMA logic, the second CDMA sequence to the second portion.

17. The electronic device of claim 6, comprising:

first inverse transform logic configured to convert the first signal from the frequency domain to the time domain; and second inverse transform logic configured to convert the second signal from the frequency domain to the time domain.

18. The electronic device of claim 6, comprising:

a first symbol accumulator configured to determine the first set of symbols associated with the first signal; and a second symbol accumulator configured to determine the second set of symbols associated with the second signal.

19. The user equipment of claim 1, wherein the processing circuitry is configured to receive a maximum length sequence from a sequence generator.

20. The user equipment of claim 19, wherein the first CDMA code and the second CDMA code are each based on the maximum length sequence.

* * * * *